(12) United States Patent
Vogelsang et al.

(10) Patent No.: US 12,475,944 B2
(45) Date of Patent: *Nov. 18, 2025

(54) MULTIDROP OPTICAL INPUT/OUTPUT MODULE

(71) Applicant: Rambus Inc., San Jose, CA (US)

(72) Inventors: Thomas Vogelsang, Mountain View, CA (US); Mark D. Kellam, Siler City, NC (US)

(73) Assignee: Rambus Inc., San Jose, CA (US)

( * ) Notice: Subject to any disclaimer, the term of this patent is extended or adjusted under 35 U.S.C. 154(b) by 734 days.

This patent is subject to a terminal disclaimer.

(21) Appl. No.: 17/852,169

(22) Filed: Jun. 28, 2022

(65) Prior Publication Data

US 2023/0008889 A1 Jan. 12, 2023

Related U.S. Application Data

(60) Provisional application No. 63/219,231, filed on Jul. 7, 2021.

(51) Int. Cl.
*G11C 11/42* (2006.01)
*G02B 6/12* (2006.01)
*G02B 6/293* (2006.01)

(52) U.S. Cl.
CPC .......... *G11C 11/42* (2013.01); *G02B 6/12007* (2013.01); *G02B 2006/12069* (2013.01); *G02B 6/29338* (2013.01)

(58) Field of Classification Search
CPC . G11C 11/42; G11C 7/1081; G02B 6/293338; G02B 6/29343
See application file for complete search history.

(56) References Cited

U.S. PATENT DOCUMENTS

2008/0112703 A1* 5/2008 Beausoleil ......... G02B 6/12007
398/50

OTHER PUBLICATIONS

Bahadori, Meisam et. al., "Impact of Backscattering on Microring-based Silicon Photonic Links", IEEE, 978-1-5386-5352-4, 2018, 2 pages.

(Continued)

*Primary Examiner* — Chad H Smith
(74) *Attorney, Agent, or Firm* — The Neudeck Law Firm, LLC

(57) ABSTRACT

Multidrop optical connections are used for an optical memory module. Multiple buffer integrated circuits on a module each receive information from the host system using different wavelengths of light transmitted on the same waveguide. Multiple buffer integrated circuits each transmit information back to the CPU using different wavelengths of light transmitted on another waveguide. Wavelength resonant ring couplers disposed on the buffer integrated circuits are used to separate the wavelength being received by a particular buffer integrated circuit from the wavelengths of light destined for other buffer integrated circuits on the same waveguide. Wavelength resonant ring modulators also disposed on the buffer integrated circuits modulate specific wavelengths of light unique to each buffer integrated circuit to transmit information to the CPU.

20 Claims, 22 Drawing Sheets

(56) References Cited

OTHER PUBLICATIONS

Beamer, Scott et. al., "Re-Architecting DRAM Memory Systems with Monolithically Integrated Silicon Photonics", ISCA 10, Saint-Malo, France, Jun. 19-23, 2010, 2010 ACM 978-1-4503-0053-7/10/06, 12 pages.

Bogaerts, Wim et. al., "Silicon Microring Resonators", Laser Photonics Rev. 6, No. 1, 47-73 (2012)/DOI 10.1002/lpor.201100017, www.lpr-journal.org, 2012, 28 pages.

Campenhout, Joris Van et. al., "Low-Voltage, Low-Loss, Multi-GB/s Silicon Micro-Ring Modulator base on a MOS Capacitor", Abstract Only, 2012 Optical Society of America, 2012, 1 page.

Dangel, Roger et. al., "Polymer Waveguides Enabling Scalable Low-Loss Adiabatic Optical Coupling for Silicon Photonics", IEEE Journal of Selected Topics in Quantum Electronics, vol. 24, No. 4, Jul./Aug. 2018, 11 pages.

Hadke, Amit et al., "OCDIMM: Scaling the DRAM Memory Wall Using WDM Based Optical Interconnects", 16th IEEE Symposium on High Performance Interconnects, IEEE Computer Society. DOI 10.1109/HOTL.2008.25, 2008. 7 pages.

Kurczveil, Geza et. al., "On-Chip Hybrid Silicon Quantum Dot Comb Laser With 14 Error-Free Channels", IEEE, 978-1-5386-6486-5, 2018, 2 pages.

Trindell, Paula, "Connectors and Splices: Correct Alignment Spells Success", Tyco Electronics, Connectors and Splices: Correct Alignment Spells Success, Fiber Optics & Communications, Photonics Handbook, Photonics Buyers' Guide, Downloaded Apr. 2, 2021. 11 pages.

Udipi, Aniruddha N. et. al., "Combining Memory and a Controller with Photonics through 3D-Stacking to Enable Scalable and Entergy-Efficient Systems", ISCA'11. San Jose, CA, Jun. 4-8, 2011, 2011 ACM 978-1-4503-0472-6/11/06, 12 pages.

Vantrease, Dana et. al., "Corona: System Implication of Emerging Nanophotonic Technology", ACM SIGARCH Computer Architecture News, vol. 36, No. 3. https://doi.org/10-1145-1394608.1382135, Jun. 2008. 12 pages.

Wang, Zhehui et. al., "MOCA: an Inter/Intra-Chip Optical Network for Memory", IEEE, ISBN 978-1-4503-4927-7, DOI: http://dx.doi.org/10.1145/3061639.3062286, DAC '17, Austin, TX, Jun. 18-22, 2017. 6 pages.

Zhang, Lei et. al., "On Reducing Insertion Loss in Wavelength-Routed Optical Network-on-Chip Architecture", Optical Society of America, vol. 6, No. 10/Oct. 2014/J. Opt. Commun. Netw., 2014. 11 Pages.

* cited by examiner

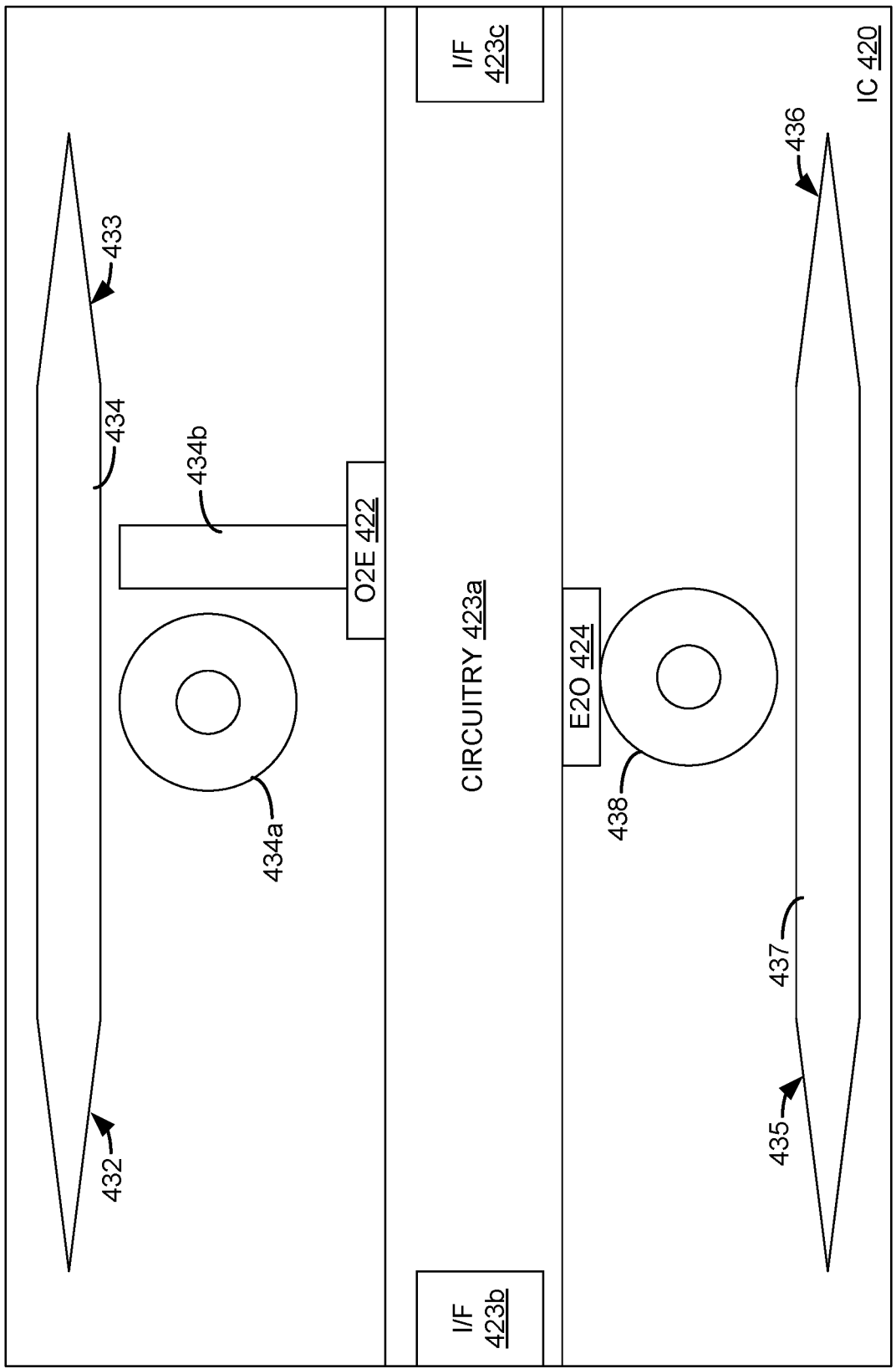

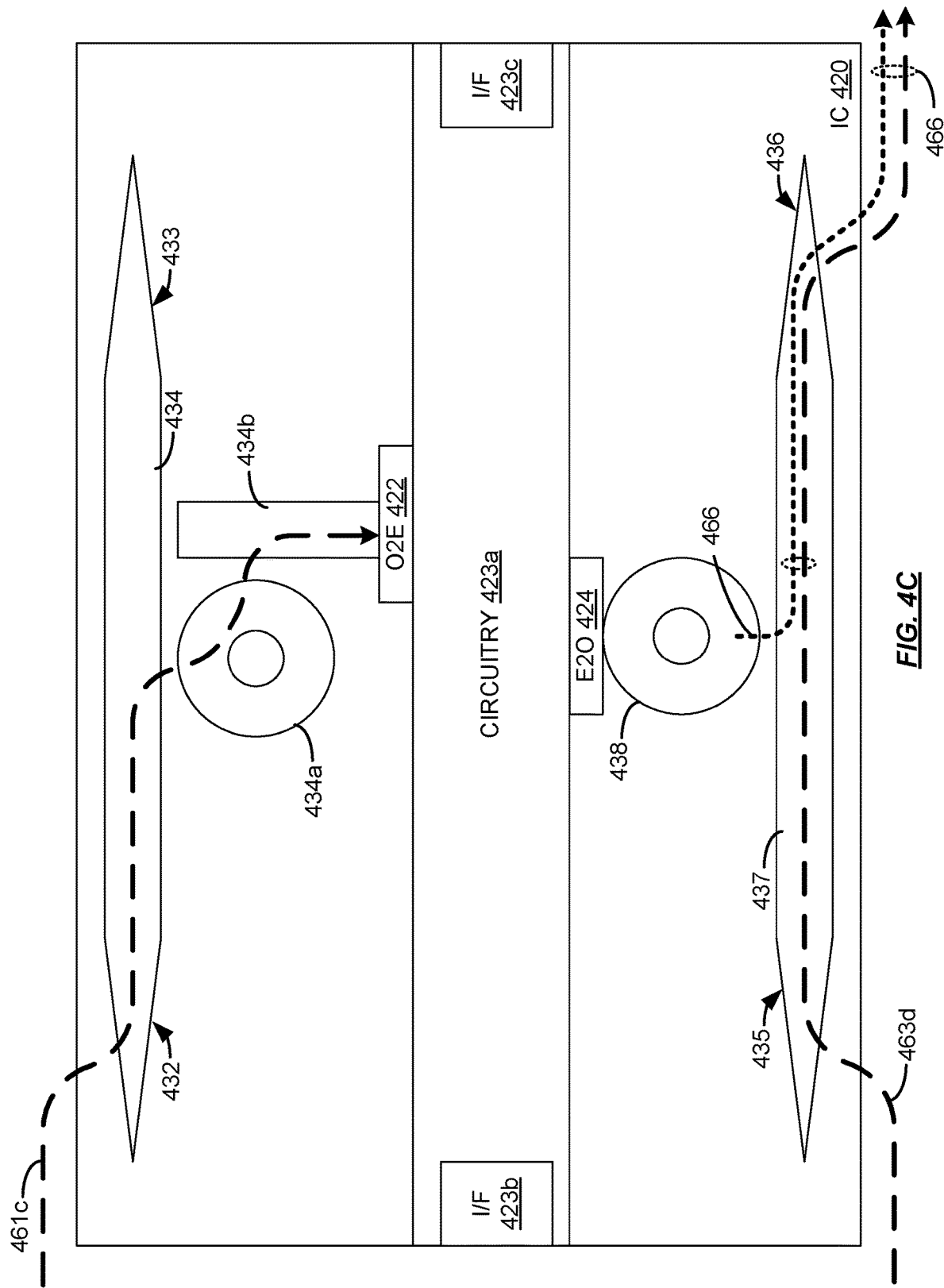

RECEIVE, VIA AN OPTICAL INTERFACE OF A MODULE, A LIGHT WAVE CARRIER, CARRYING INFORMATION, FROM A HOST SYSTEM
502

COUPLE THE LIGHT WAVE CARRIER INTO A POLYMER WAVEGUIDE DISPOSED ON THE MODULE
504

COUPLE THE LIGHT WAVE CARRIER FROM THE POLYMER WAVEGUIDE INTO A FIRST SILICON WAVEGUIDE DISPOSED ON A FIRST INTEGRATED CIRCUIT
506

COUPLE THE LIGHT WAVE CARRIER BACK FROM THE FIRST SILICON WAVEGUIDE INTO THE POLYMER WAVEGUIDE
508

COUPLE THE LIGHT WAVE CARRIER RECEIVED BACK FROM THE FIRST SILICON WAVEGUIDE INTO A SECOND SILICON WAVEGUIDE DISPOSED ON A SECOND INTEGRATED CIRCUIT
510

COUPLE THE LIGHT WAVE CARRIER BACK FROM THE SECOND SILICON WAVEGUIDE INTO THE FIRST POLYMER WAVEGUIDE.
512

*FIG. 5*

RECEIVE, FROM A HOST SYSTEM AND VIA AN OPTICAL INTERFACE OF A MODULE, A FIRST LIGHT WAVE CARRIER CARRYING FIRST INFORMATION AND A SECOND LIGHT WAVE CARRIER CARRYING SECOND INFORMATION, THE FIRST AND SECOND LIGHT WAVE CARRIERS HAVING DIFFERENT WAVELENGTHS
602

COUPLE THE FIRST AND SECOND LIGHT WAVE CARRIERS INTO A POLYMER WAVEGUIDE DISPOSED ON THE MODULE
604

COUPLE THE FIRST AND SECOND LIGHT WAVE CARRIERS FROM THE POLYMER WAVEGUIDE INTO A FIRST SILICON WAVEGUIDE DISPOSED ON A FIRST INTEGRATED CIRCUIT
606

COUPLE THE FIRST LIGHT WAVE CARRIER TO A FIRST LIGHT SENSING DEVICE DISPOSED ON THE FIRST INTEGRATED CIRCUIT TO RECEIVE THE FIRST INFORMATION FROM THE FIRST LIGHT WAVE CARRIER
608

COUPLE THE SECOND LIGHT WAVE CARRIER BACK FROM THE FIRST SILICON WAVEGUIDE INTO THE POLYMER WAVEGUIDE
610

COUPLE THE SECOND LIGHT WAVE CARRIER RECEIVED BACK FROM THE FIRST SILICON WAVEGUIDE INTO A SECOND SILICON WAVEGUIDE DISPOSED ON A SECOND INTEGRATED CIRCUIT
612

COUPLE THE SECOND LIGHT WAVE CARRIER TO A SECOND LIGHT SENSING DEVICE DISPOSED ON THE SECOND INTEGRATED CIRCUIT TO RECEIVE THE SECOND INFORMATION
614

*FIG. 6*

```
┌─────────────────────────────────────────────────────────────┐
│ COUPLE A FIRST LIGHT WAVE CARRIER MODULATED WITH FIRST      │
│ INFORMATION FOR A MEMORY DEVICE FROM A FIRST POLYMER        │
│ WAVEGUIDE ON A MODULE INTO A FIRST SILICON WAVEGUIDE        │
│ DISPOSED ON A FIRST INTEGRATED CIRCUIT                      │
│                          802                                │
└─────────────────────────────────────────────────────────────┘
                              │
┌─────────────────────────────────────────────────────────────┐
│ COUPLE THE FIRST LIGHT WAVE CARRIER TO A FIRST LIGHT SENSING│
│ DEVICE DISPOSED ON THE FIRST INTEGRATED CIRCUIT TO RECEIVE  │
│ THE FIRST INFORMATION FROM THE FIRST LIGHT WAVE CARRIER     │
│                          804                                │
└─────────────────────────────────────────────────────────────┘
                              │
┌─────────────────────────────────────────────────────────────┐
│ COMMUNICATE THE FIRST INFORMATION WITH THE MEMORY DEVICE    │
│                          806                                │
└─────────────────────────────────────────────────────────────┘
                              │
┌─────────────────────────────────────────────────────────────┐
│ RECEIVE SECOND INFORMATION FROM THE MEMORY DEVICE           │
│                          808                                │
└─────────────────────────────────────────────────────────────┘
                              │
┌─────────────────────────────────────────────────────────────┐
│ RECEIVE, FROM A SECOND POLYMER WAVEGUIDE AND INTO A         │
│ SECOND SILICON WAVEGUIDE DISPOSED ON THE FIRST INTEGRATED   │
│ CIRCUIT, A SECOND LIGHT WAVE CARRIER THAT IS UNMODULATED    │
│                          810                                │
└─────────────────────────────────────────────────────────────┘
                              │
┌─────────────────────────────────────────────────────────────┐
│ MODULATE THE SECOND LIGHT WAVE CARRIER WITH THE SECOND      │
│ INFORMATION                                                 │
│                          812                                │
└─────────────────────────────────────────────────────────────┘
                              │
┌─────────────────────────────────────────────────────────────┐
│ COUPLE THE SECOND LIGHT WAVE CARRIER MODULATED WITH THE     │
│ SECOND INFORMATION INTO THE SECOND POLYMER WAVEGUIDE        │
│                          814                                │
└─────────────────────────────────────────────────────────────┘
                              │
┌─────────────────────────────────────────────────────────────┐
│ COUPLE THE SECOND LIGHT WAVE CARRIER MODULATED WITH THE     │
│ SECOND INFORMATION INTO A THIRD SILICON WAVEGUIDE DISPOSED  │
│ ON A SECOND INTEGRATED CIRCUIT                              │
│                          816                                │
└─────────────────────────────────────────────────────────────┘
```

*FIG. 8*

MULTIDROP OPTICAL INPUT/OUTPUT MODULE

BRIEF DESCRIPTION OF THE DRAWINGS

FIGS. 4A-4C illustrate an integrated circuit compatible with a multidrop optical input/output module.

FIG. 5 is a flowchart illustrating optical transmission among a plurality of devices on a module.

FIG. 6 is a flowchart illustrating multidrop optical communication to a plurality of devices on a module.

FIG. 8 is a flowchart illustrating communication with an electronic device on a module.

DETAILED DESCRIPTION OF THE EMBODIMENTS

The capacity and bandwidth of dynamic random access memory (DRAM) modules per central processing unit (CPU) may be limited by the number of connections available on the CPU package and the desire to have the DRAM modules electrically close to the CPU in order to limit interconnect lengths. Optical connections may be used to communicate between the CPU and memory module(s). However, optical fiber connections to/from the CPU and/or the memory modules are a relatively expensive part of a system's assembly process. In an embodiment, multidrop optical connections are used as part of a module to allow each optical memory module to reduce the number of optical connections between the CPU and module. Multiple buffer integrated circuits on a module each receive information from the CPU using different wavelengths of light transmitted on the same waveguide. Likewise, the multiple buffer integrated circuits each transmit information back to the CPU using different wavelengths of light transmitted on another waveguide.

In an embodiment, wavelength resonant ring couplers disposed on the buffer integrated circuits are used to separate the wavelength being received by a particular buffer integrated circuit from the wavelengths of light destined for other buffer integrated circuits on the same waveguide. Wavelength resonant ring modulators also disposed on the buffer integrated circuits modulate specific wavelengths of light unique to each buffer integrated circuit to transmit information to the CPU. In this manner, multidrop and concurrent, reception and transmission of information between the CPU and buffer integrated circuit is accomplished. The buffer integrated circuits may relay the received and/or transmitted information between the CPU and one or more memory devices.

Figure 1:
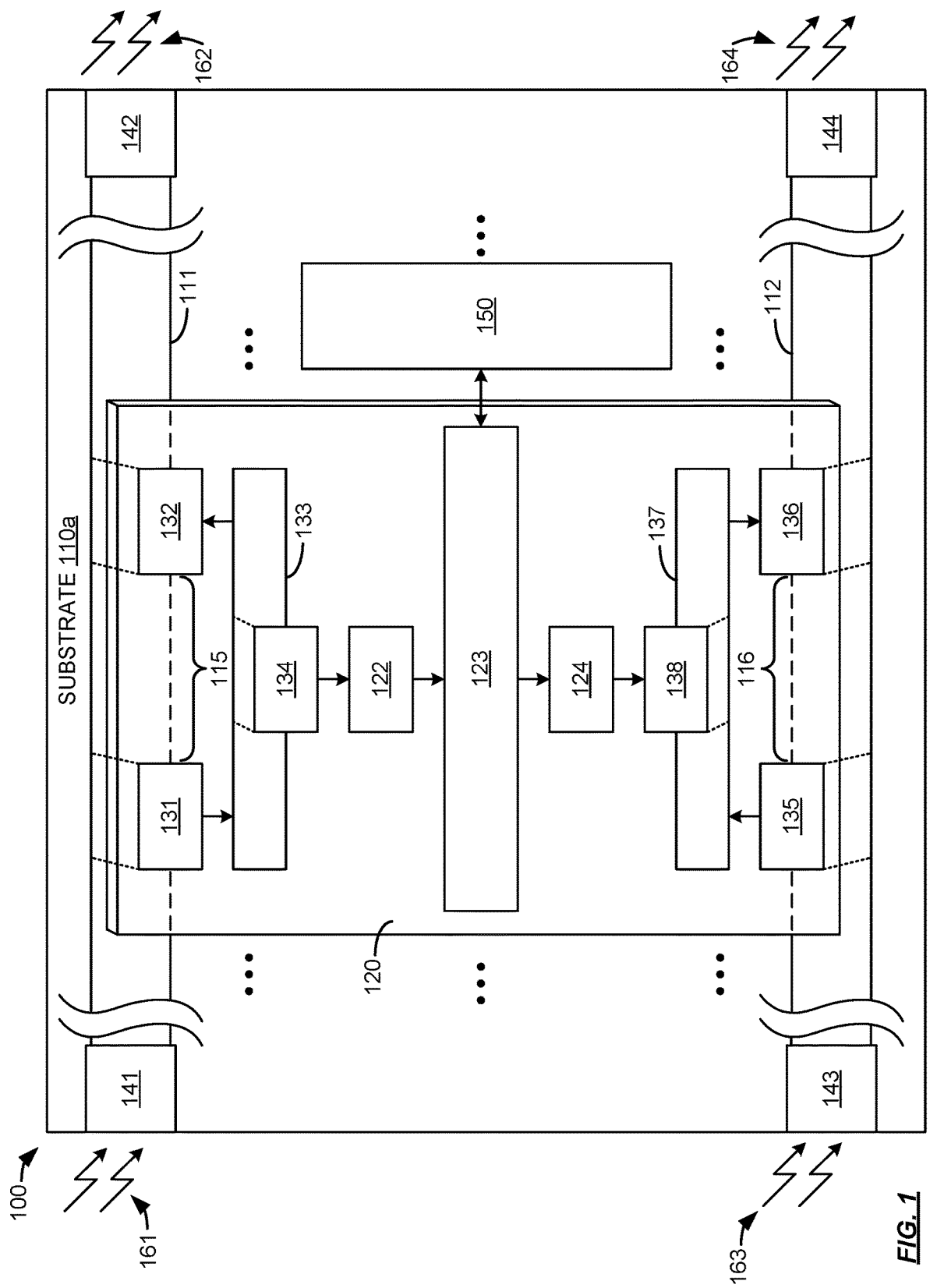
FIG. 1 is a block diagram illustrating a multidrop optical input/output module.

FIG. 1 is a block diagram illustrating a multidrop optical input/output module. In FIG. 1, module 100 comprises substrate 110a, polymer waveguide 111, polymer waveguide 112, buffer die 120, optical connections 141-144, and integrated circuit 150. Buffer die 120 includes optical-to-electrical (OE) converter 122, electrical circuitry 123, electrical-to-optical (EO) converter 124, optical couplers 131-132, silicon (Si) waveguide 133, wavelength selective optical coupler 134, optical couplers 135-136, Si waveguide 137, and wavelength selective optical modulator 138.

In operation, module 100 receives light 161 via optical connection 141. Light 161 may be provided by a host system (not shown if FIG. 1). In an embodiment, light 161 comprises multiple wavelengths of light that are each modulated (e.g., by a host system) to carry information. It should be understood that this is a form of frequency division multiplexing where each frequency of light (wavelength) is modulated and may carry information independent of the other frequencies of light. Because no light source is perfect, and modulation necessarily broadens the spectrum of even a single frequency light signal, as used herein, 'frequency of light' or 'frequencies of lights' refers to a relatively narrow range of light frequencies (or wavelengths) around a center frequency (or wavelength) that is distinguishable from other relatively narrow ranges of light frequencies centered around other center frequencies. The light 161 is coupled into polymer waveguide 111 by optical connection 141. Once coupled into polymer waveguide 111, light 161 propagates along polymer waveguide 111 from left to right in FIG. 1.

When light 161 propagating along waveguide 111 reaches optical coupler 131, light 161 is substantially coupled from polymer waveguide 111 into Si waveguide 133 by optical coupler 131. In an embodiment, optical coupler 131 is a tapered silicon waveguide that is in direct contact with polymer waveguide 111. Thus, in an embodiment, buffer die 120 is flip-chip bonded to substrate 110a such that a tapered section of optical coupler 131 is in direct contact with polymer waveguide 111 leading to adiabatic transfer of light from waveguide 111 to Si waveguide 133. This adiabatic transfer leads to a substantially dark section 115 of polymer waveguide 111.

Once coupled into Si waveguide 133, light 161 propagates along Si waveguide 133 from left to right in FIG. 1. When light 161 propagating along waveguide 111 reaches wavelength selective optical coupler 134, a single frequency of light of multiwavelength light 161 is substantially diverted from Si waveguide 133 by wavelength selective optical coupler 134. The other frequencies of light of multiwavelength light 161 continue to propagate from left to right along Si waveguide 133. When the remaining bands of multiwavelength light 161 reach optical coupler 132, the remaining wavelengths of light 161 are substantially coupled back from Si waveguide 133 into polymer waveguide 111 by optical coupler 132. In an embodiment, optical coupler 132 is a tapered silicon waveguide that is direct contact with polymer waveguide 111. Thus, in an embodiment, buffer die 120 is flip-chip bonded to substrate 110a such that a tapered section of optical coupler 132 is in direct contact with polymer waveguide 111 leading to adiabatic transfer of light from Si waveguide 133 to polymer waveguide 111. This adiabatic transfer ends the substantially dark section 115 of polymer waveguide 111.

Once coupled back into polymer waveguide 111, the remaining bands of light 161 propagate along polymer waveguide 111 from left to right in FIG. 1 until (a) the remaining wavelengths of light 161 (if any) exit module 100 via optical connection 142 as light 162; or (b) another buffer die (not shown in FIG. 1) receives the remaining wavelengths of light 161 and selectively diverts a different wavelength of light 161.

The frequency of light of multiwavelength light 161 that was substantially diverted from Si waveguide 133 by wavelength selective optical coupler 134 is directed to optical to electrical converter 122. Optical to electrical converter 122 demodulates the information being carried by the diverted wavelength of light 161 and provides it to electrical circuitry 123.

Electrical circuitry 123 processes the information demodulated from light 161. Electrical circuitry 123 may provide some or all of the demodulated information to additional integrated circuit(s) (e.g., integrated circuit 150) that are part of module 100. Electrical circuitry 123 may also receive information/signals/etc. from additional integrated circuit(s) (e.g., integrated circuit 150) that are part of module 100. Some or all of the information received from additional integrated circuits, and/or information processed/generated by electrical circuitry 123 may be provided to electrical-to-optical (EO) converter 124.

Module 100 receives light 163 via optical connection 141. In an embodiment, light 163 comprises multiple wavelengths of light that are not each modulated to carry information. At least the unmodulated wavelengths of light 163 are coupled into polymer waveguide 112 by optical connection 143. Once coupled into polymer waveguide 112, light 163 propagates along polymer waveguide 112 from left to right in FIG. 1.

When light 163 propagating along waveguide 112 reaches optical coupler 135, light 163 is substantially coupled from polymer waveguide 112 into Si waveguide 137 by optical coupler 135. In an embodiment, optical coupler 135 is a tapered silicon waveguide that is direct contact with polymer waveguide 112. Thus, in an embodiment, buffer die 120 is flip-chip bonded to substrate 110a such that a tapered section of optical coupler 135 is in direct contact with polymer waveguide 112 leading to adiabatic transfer of light from waveguide 112 to Si waveguide 137. This adiabatic transfer leads to a substantially dark section 116 of polymer waveguide 112.

Once coupled into Si waveguide 137, light 163 propagates along Si waveguide 137 from left to right in FIG. 1. When light 163 propagating along waveguide 112 reaches wavelength selective optical modulator 138, a single frequency of light of multiwavelength light 163 is modulated by wavelength selective optical modulator 138 with the information from electrical circuitry 123 received via EO converter 124. The other frequencies of light of multiwavelength light 163 continue to propagate unmodulated by buffer chip 120 from left to right along Si waveguide 137. When the modulated and unmodulated bands of multiwavelength light 163 reach optical coupler 136, light 161 is substantially coupled back from Si waveguide 137 into polymer waveguide 112 by optical coupler 136. In an embodiment, optical coupler 136 is a tapered silicon waveguide that is direct contact with polymer waveguide 112. Thus, in an embodiment, buffer die 120 is flip-chip bonded to substrate 110a such that a tapered section of optical coupler 136 is in direct contact with polymer waveguide 112 leading to adiabatic transfer of light from Si waveguide 137 to polymer waveguide 112. This adiabatic transfer ends the substantially dark section 116 of polymer waveguide 112.

Once coupled back into polymer waveguide 112, the modulated and unmodulated bands of light 163 propagate along polymer waveguide 112 from left to right in FIG. 1 until (a) at least the modulated bands wavelengths of light 163 exit module 100 via optical connection 144 as light 164; or (b) another buffer die (not shown in FIG. 1) receives the modulated and unmodulated wavelengths of light 163 and modulates a different wavelength of light 163 with information. The modulated light 164 may be provided to the host system (not shown if FIG. 1).

Figure 2A:
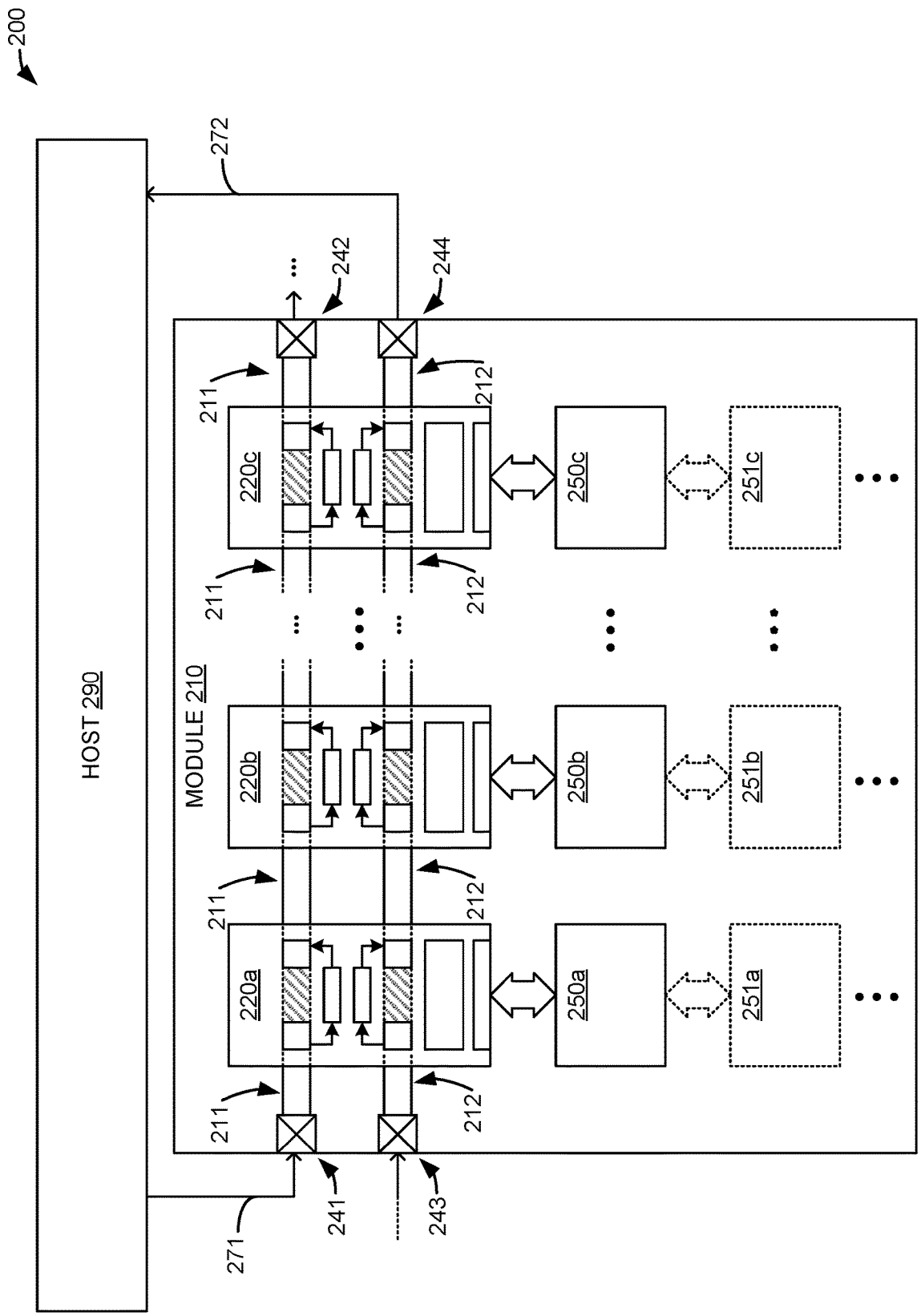
FIGS. 2A-2C illustrate a system with a multidrop optical input/output module.
Figure 2B:
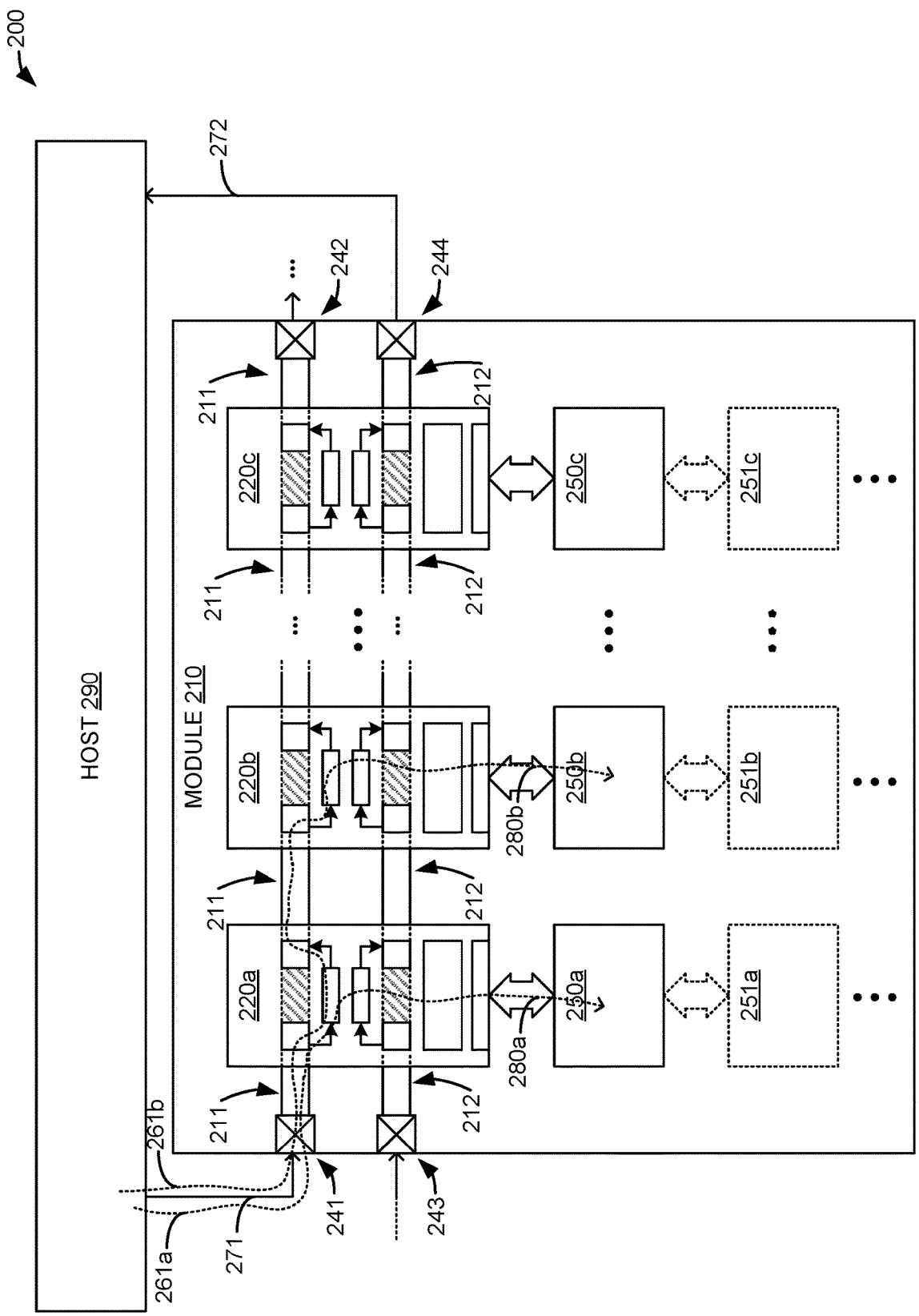
Figure 2C:
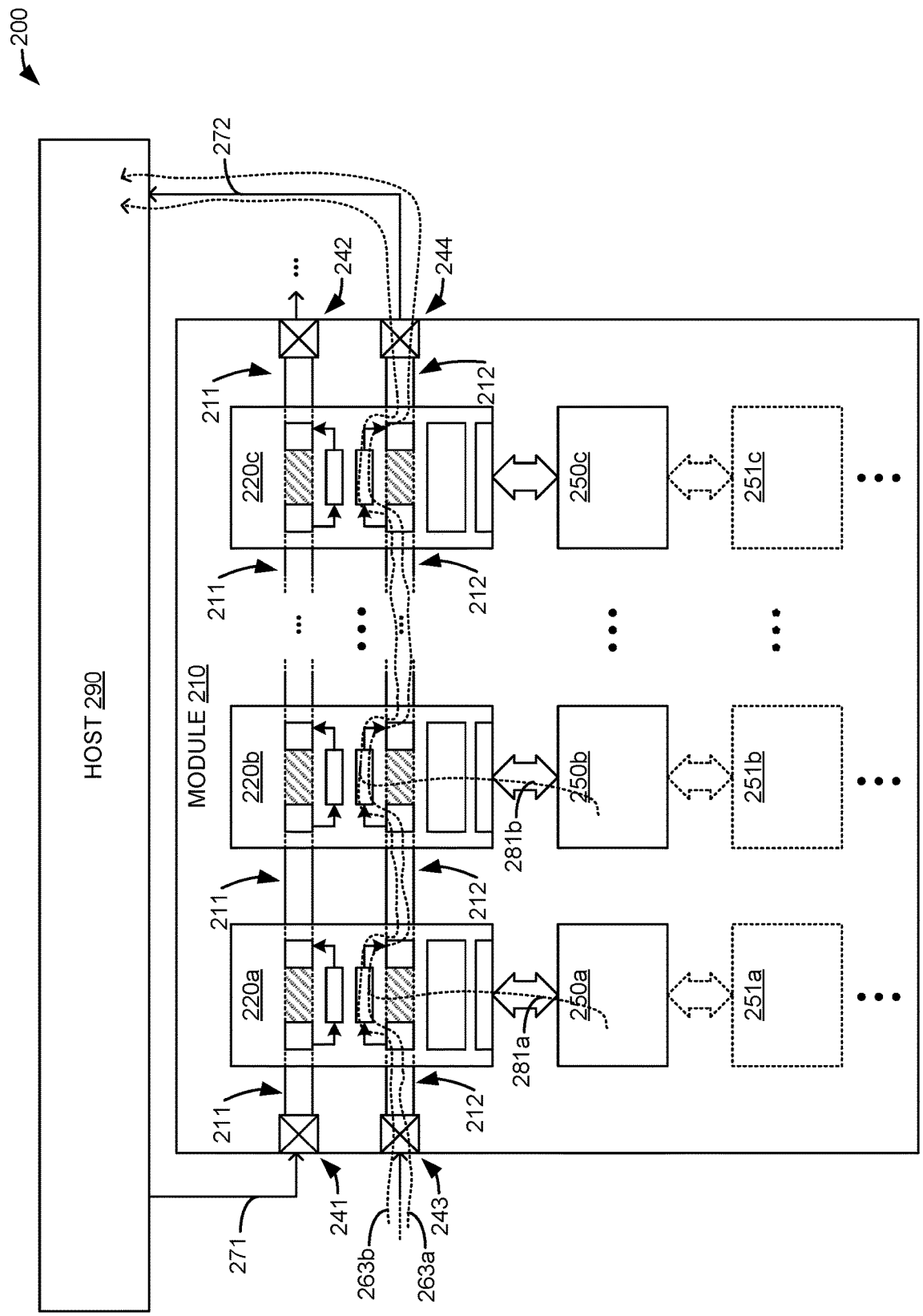

FIGS. 2A-2C illustrate a system with a multidrop optical input/output module. In FIGS. 2A-2C, system 200 comprises module 210, and optical links 271-272. Module 210 includes polymer waveguide 211, polymer waveguide 212, buffer integrated circuits 220a-220c, and optical interfaces 241-244. Optical link 271 operatively couples host 290 to module 210 via optical interface 241. Optical link 272 operatively couples module 210 to host 290 via optical interface 244. Optical interface 243 receives light from a source (e.g., a laser or other module(s) not shown in FIGS. 2A-2C). Optical interface 242 may emit light (e.g., to an optical sink or other module(s) not shown in FIGS. 2A-2C).

Buffers 220a-220c are electrically coupled to integrated circuits 250a-250c, respectively. Buffers 220a-220c may be electrically coupled to additional integrated circuits 251a-251c, respectively.

Buffers 220a-220c are operatively coupled to polymer waveguide 211 to receive a plurality of modulated light wavelengths from host 290. Each of buffers 220a-220c couples light from host 290 into an on-chip silicon (Si) waveguide, selectively redirects at least one modulated light wavelength to an on-chip optical-to-electrical converter, and returns the remaining modulated light wavelength(s) (if any) to polymer waveguide 211.

Similarly, buffers 220a-220c are operatively coupled to polymer waveguide 212 to receive a plurality of unmodulated modulated light wavelengths from a source (e.g., on module laser or host 290). Each of buffers 220a-220c couples light from optical interface 243 into an on-chip silicon (Si) waveguide, selectively modulates at least one light wavelength using an on-chip electrical-to-optical converter/modulator, and returns the modulated and unmodulated light wavelength(s) (if any) back to polymer waveguide 212.

In FIGS. 2A-2C, buffers 220a-220c are disposed from left to right along polymer waveguides 211-212 in the respective order 220a to 220c. Thus, each of buffers 220a-220c are sequentially and operatively coupled to polymer waveguide 211. In other words, buffer 220a receives light carried by polymer waveguide 211 from optical interface 241 without any intervening buffers 220b-220c. Buffer 220b receives light from polymer waveguide 211 after the light has been coupled into buffer 220a and coupled back from buffer 220a and some light has optionally been redirected by buffer 220a. This pattern continues until buffer 220c receives light from a buffer (not shown in FIGS. 2A-2C) that is immediately to the left of buffer 220c and a selective number of wavelengths of light have been redirected by the intervening buffers 220a-220b etc.

Similarly, each of buffers 220a-220c are sequentially and operatively coupled to polymer waveguide 212. In other words, buffer 220a receives unmodulated light carried by polymer waveguide 212 from optical interface 243 without any intervening buffers 220b-220c. Buffer 220b receives light from polymer waveguide 212 after the light has been coupled into buffer 220a and coupled back from buffer 220a and at least one wavelength of the light has optionally been modulated by buffer 220a. This pattern continues until buffer 220c receives light from a buffer (not shown in FIGS. 2A-2C) that is immediately to the left of buffer 220c and a selected number of wavelengths of light have been modulated by the intervening buffers 220a-220b etc. Optical interface 244 couples at least the modulated light (i.e., the wavelengths of light that have been modulated by buffers 220a-220c) to optical link 272. Optical link 272 couples the modulated light to host 290.

From the foregoing, it should be understood that information (e.g., commands, addresses, data, etc.) may be transmitted from host 290 via optical link 271, optical interface 241, polymer waveguide 211, and buffer 220a to integrated circuit(s) 250a-251a using one or more modulated wavelengths of light. Likewise, information (e.g., commands, addresses, data, etc.) may be transmitted from host 290 via optical link 271, optical interface 241, polymer waveguide 211, buffer 220a (and any intervening buffers 220a-220c along polymer waveguide 211) to integrated circuit(s) 250b-251b and/or integrated circuit(s) 250b-251b using one or more modulated wavelengths of light.

Conversely, information (e.g., data) may be transmitted from integrated circuit(s) 250a-251a via the electrical connections between integrated circuit(s) 250a-251a, buffer 220a, buffer 220b (and any intervening buffers 220a-220c along polymer waveguide 212), optical interface 244, and optical link 272 to host 290 using one or more modulated wavelengths of light. Likewise, information (e.g., data) may be transmitted from integrated circuit(s) 250b-251b and 250c-251c via the electrical connections to the corresponding buffer 220b, buffer 220c (and any intervening buffers 220a-220c along polymer waveguide 212), optical interface 244, and optical link 272 to host 290 using one or more modulated wavelengths of light.

In an embodiment, integrated circuits 250a-250c may be memory devices. For example, integrated circuits 250a-250c may be dynamic random access memories. In other embodiments, integrated circuits may be or comprise, but are not limited to, SRAM, DDR3, DDR4, DDR5, DDR6, XDR, XDR2, GDDR3, GDDR4, GDDR5, GDDR6, LPDDR, and/or LPDDR2 and successor memory standards and technologies. Integrated circuits 250a-250c may include a stack of devices either connected with wire bonds such as DDP DRAM or connected as a through-silicon-via (TSV) stack such as hybrid memory cube (HMC), 3DS DRAM or HBM DRAM.

FIG. 2B illustrates the flow of information from host 290 to integrated circuits 250a-250b. Modulated (with information) light wavelengths are generated by host 290 and transmitted via optical link 271. This is illustrated in FIG. 2B by dashed arrows 261a-261b exiting host 290 and proceeding along optical link 271, through optical interface 241, and into polymer waveguide 211. Buffer 220a couples both wavelengths of modulated light into an on-chip silicon waveguide. Buffer 220a diverts one of the wavelengths of modulated light. Buffer 220a couples the remaining modulated light back into polymer waveguide 211.

Buffer 220a converts the diverted wavelength of modulated light to electrical signals corresponding to the information transmitted by host 290 on the wavelength represented by line 261a. The information transmitted by host 290, now in the form of electrical signals, is provided to integrated circuit 250a via an electrical interface. This is illustrated in FIG. 2B by arrow 280a.

The remaining modulated light that was coupled back into polymer waveguide 211 by buffer 220a is coupled by buffer 220b into an on-chip silicon waveguide. Buffer 220b diverts the second of the wavelengths of modulated light. Buffer 220b couples the remaining modulated light (if any) back into polymer waveguide 211. Buffer 220b converts the diverted wavelength of modulated light to electrical signals corresponding to the information transmitted by host 290 on the wavelength represented by line 261b. The information transmitted by host 290, now in the form of electrical signals, is provided to integrated circuit 250b via an electrical interface. This is illustrated in FIG. 2B by arrow 280b.

FIG. 2C illustrates the flow of information from integrated circuits 250a-250b to host 290. Unmodulated light wavelengths are received by module 210 via optical interface 243. This is illustrated in FIG. 2C by dashed lines 263a-263b entering optical interface 243, and proceeding into polymer waveguide 212. Buffer 220a couples the light wavelengths into an on-chip silicon waveguide. Buffer 220a modulates information received from integrated circuit 250a onto at least one wavelength of the received light traveling through the on-chip silicon waveguide. This is illustrated in FIG. 2C by line 281a, running from integrated circuit 250a, merging with line 263a inside buffer 220a. The modulated and unmodulated light is coupled by buffer 220a back into polymer waveguide 211.

Buffer 220b couples the modulated and unmodulated light wavelengths into an on-chip silicon waveguide. Buffer 220b modulates information received from integrated circuit 250b onto at least one wavelength of the received light traveling through the on-chip silicon waveguide. This is illustrated in FIG. 2C by line 281b, running from integrated circuit 250b, merging with line 263b inside buffer 220b. The modulated and unmodulated light is coupled by buffer 220b back into polymer waveguide 211. Finally, the modulated light is provided to host 290. This is illustrated in FIG. 2C by lines 263a-263b running to host 290 via optical interface 244 and optical link 272.

Figure 3:
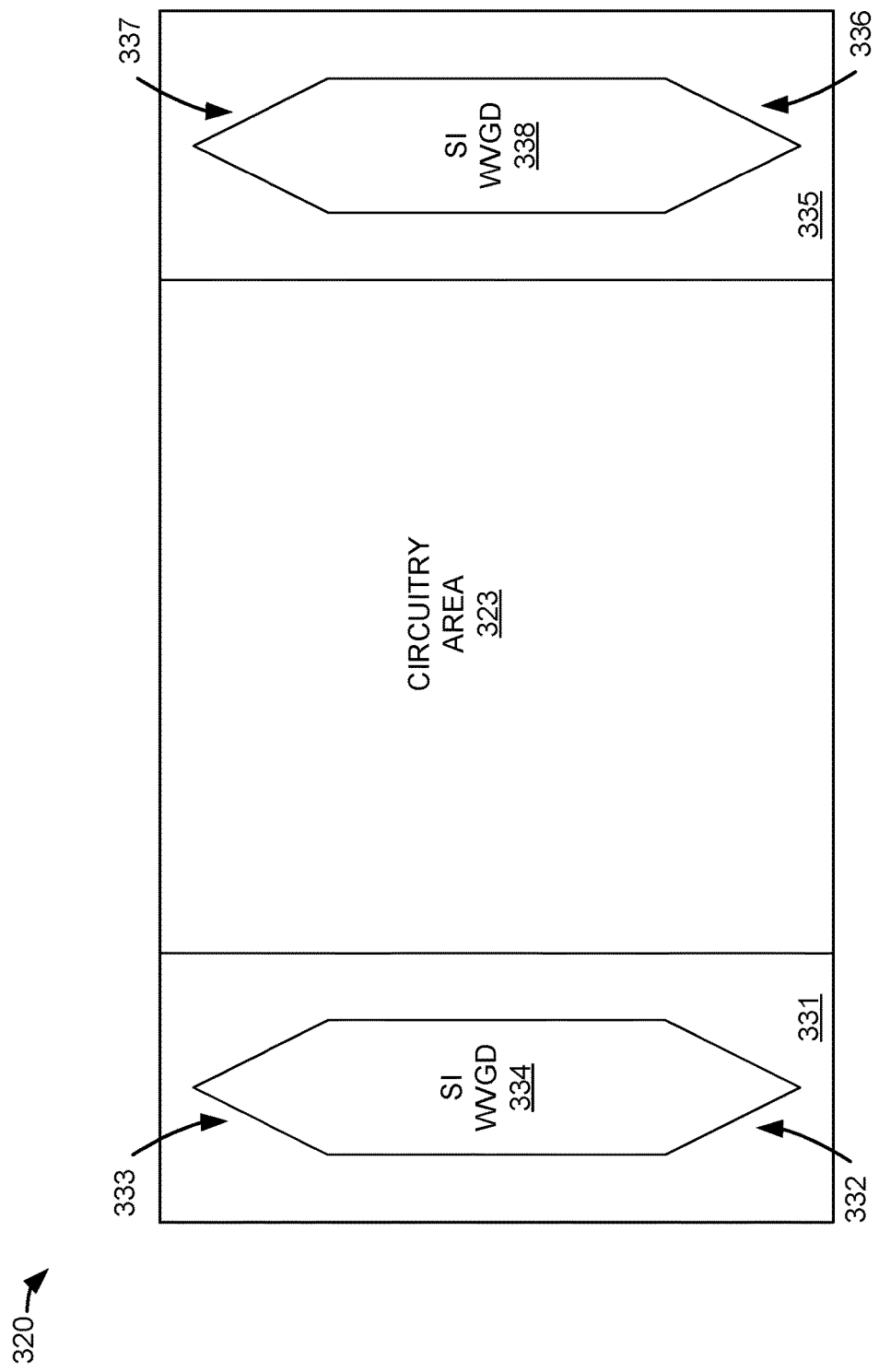
FIG. 3 illustrates an integrated circuit floorplan compatible with a multidrop optical input/output module.

FIG. 3 illustrates an integrated circuit floorplan compatible with a multidrop optical input/output module. The floorplan illustrated in FIG. 3 may be used by, for example, buffer die 120, and/or buffers 220a-220c. In FIG. 3, buffer die 320 comprises a circuitry area 323 between waveguide area 331 and tapered waveguide area 335. Waveguide area 331 is disposed on the left edge of buffer die 320. Tapered waveguide area 335 is disposed on the right edge of buffer die 320. Waveguide area 331 include silicon waveguide 334. Silicon waveguide 334 includes taper 332 disposed near the bottom edge of buffer die 320 and taper 333 disposed near the top edge of buffer die 320. Tapered waveguide area 335 include silicon waveguide 338. Silicon waveguide 338 includes tapered waveguide area 336 disposed near the bottom edge of buffer die 320 and tapered waveguide area 337 disposed near the top edge of buffer die 320.

The floorplan illustrated in FIG. 3 is configured to allow flip-chip attachment of buffer die 320 to a substrate with polymer waveguides. To allow for the coupling of light to/from silicon waveguide 334 and silicon waveguide 338, waveguide area 331 and tapered waveguide area 335 should not include back end of line (BEOL) structures. The back end of line structures are formed as part of the second portion of IC fabrication where the individual devices get interconnected with the metallization layer(s).

Thus, it should be understood that disposing silicon waveguide 334 on one edge of buffer die 320, and silicon waveguide 338 on the opposite edge, the circuitry area 323 can have contiguous connections. Having two waveguides (i.e., silicon waveguide 334 and silicon waveguide 338) allows one waveguide to be used for input and one waveguide to be used for output, as described herein.

Figure 4B:
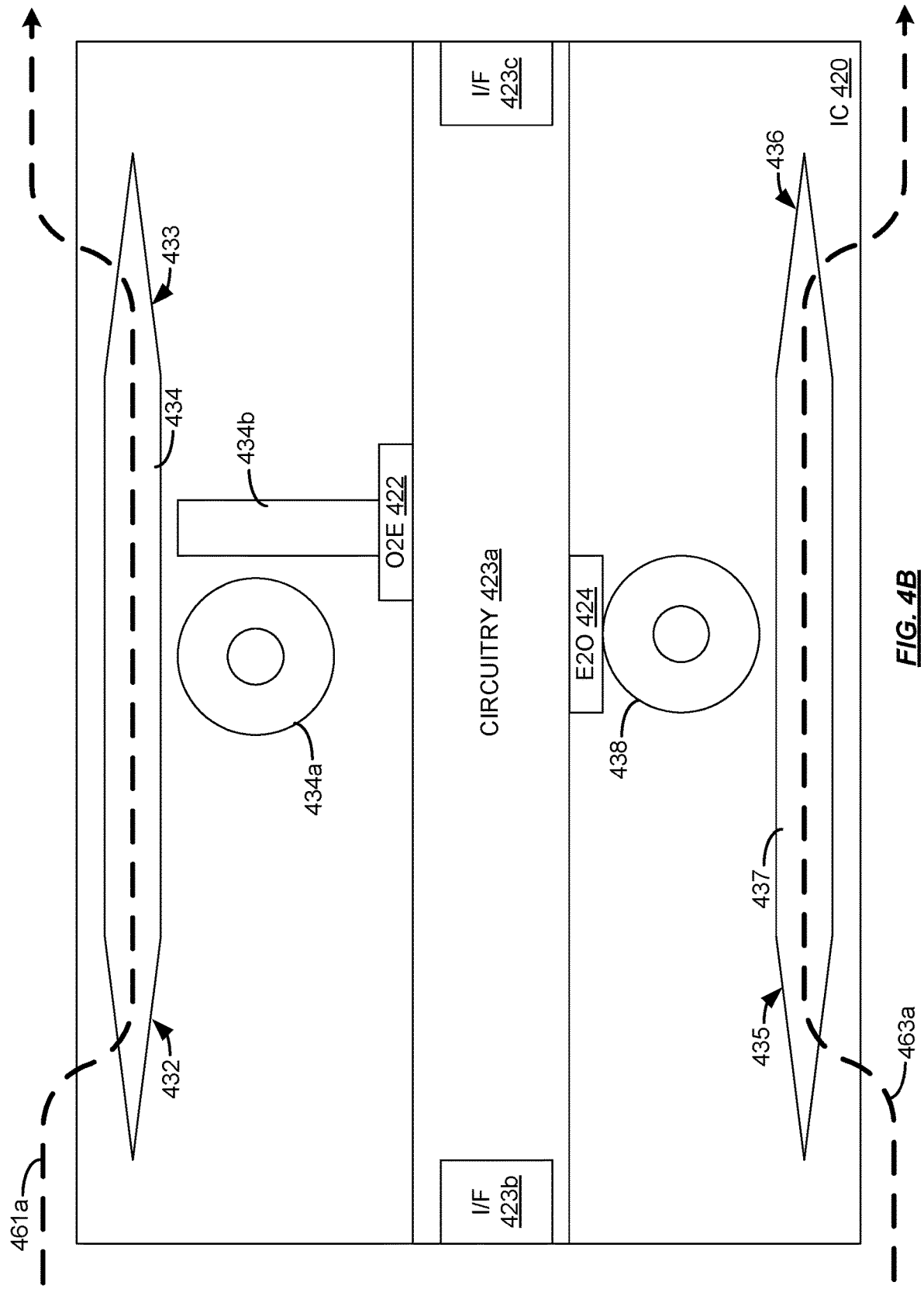

FIGS. 4A-4C illustrate an integrated circuit compatible with a multidrop optical input/output module. The elements illustrated in FIG. 4 may be part of, for example, buffer die 120, and/or buffers 220a-220c. In FIGS. 4A-4C, integrated circuit 420 includes electrical circuitry 423a, optical-to-electrical converter 422, electrical-to-optical converter 424, silicon waveguide 434, wavelength resonant ring coupler 434a, waveguide 434b, silicon waveguide 437, and wavelength resonant ring modulator 438. Electrical circuitry 423a includes electrical interface 423b and electrical interface 423c. Silicon waveguide 434 includes tapered coupler section 432 and tapered coupler section 433. Silicon waveguide 437 includes tapered coupler section 435 and tapered coupler section 436.

In operation, modulated light having multiple wavelengths and carrying information from a host is coupled from a first polymer waveguide into silicon waveguide 434 by tapered coupler section 432. If a given wavelength of light is not resonant with wavelength resonant ring coupler 434a, that wavelength of light travels along silicon waveguide 434 until it is coupled back to the first polymer waveguide by tapered coupler section 433. This is illustrated in FIG. 4B by arrow 461a entering silicon waveguide 434 in tapered coupler section 432 and exiting waveguide 434 in tapered coupler section 433. If a given wavelength of light is resonant with wavelength resonant ring coupler 434a, that wavelength of light is coupled from waveguide 434 to waveguide 434b by wavelength resonant ring coupler 434a. Waveguide 434b carries the diverted wavelength to optical-to-electrical converter 422. This is illustrated in FIG. 4C by arrow 461c entering silicon waveguide 434 in tapered coupler section 432, flowing through ring coupler 434a, entering waveguide 434b, and terminating at optical-to-electrical converter 422. Optical-to-electrical converter 422 is operatively coupled to electrical circuitry 423a to provide electrical signals corresponding to the information carried by the diverted wavelength of light to electrical circuitry 423a.

Similarly, unmodulated light having multiple wavelengths is coupled from a second polymer waveguide into silicon waveguide 437 by tapered coupler section 435. If a given wavelength of light is not resonant with wavelength resonant ring modulator 438, that wavelength of light travels along silicon waveguide 437 unmodified until it is coupled back to the second polymer waveguide by tapered coupler section 436. This is illustrated in FIG. 4B by arrow 463a entering silicon waveguide 437 in tapered coupler section 435 and exiting waveguide 437 in tapered coupler section 436. If a given wavelength of light is resonant with wavelength resonant ring modulator 438, that wavelength of light is modulated by signals from electrical circuitry 423a by a combination of electrical-to-optical converter 424 and wavelength resonant ring modulator 438. Waveguide 437 carries the modulated until it exits waveguide 437 in tapered coupler section 436. This is illustrated in FIG. 4C by arrow 463d entering silicon waveguide 437 in tapered coupler section 435, joining with arrow 466 (which represents modulation) at ring modulator 438, and both arrow 463d and arrow 466 exiting waveguide 437 in tapered coupler section 436.

FIG. 5 is a flowchart illustrating optical transmission among a plurality of devices on a module. One or more steps illustrated in FIG. 5 may be performed by, for example, module 100, system 200, buffer die 320, integrated circuit 420, and/or their components. Via an optical interface of a module, a light wave carrier carrying information from a host system is received (502). For example, module 210 may receive, at optical interface 241 and from host 290, a wavelength of light (carrier) modulated with information from host 290.

The light wave carrier is coupled into a polymer waveguide disposed on the module (504). For example, optical interface 241 may couple the light wave carrier modulated with information from host 290 into polymer waveguide 211. The light wave carrier is coupled from the polymer waveguide into a first silicon waveguide disposed on a first integrated circuit (506). For example, a tapered section of silicon waveguide on buffer 220a that is optically coupled to polymer waveguide 211 may couple the light wave carrier into the silicon waveguide on buffer 220a.

The light wave carrier is coupled back from the first silicon waveguide into the polymer waveguide (508). For example, if the light wave carrier is not diverted by a wavelength specific ring coupler while traveling in the silicon waveguide on buffer 220a, a tapered section of silicon waveguide on buffer 220a that is optically coupled to polymer waveguide 211 may couple the light wave carrier back into polymer waveguide 211.

The light wave carrier received back from the first silicon waveguide is coupled from the polymer waveguide into a second silicon waveguide disposed on a second integrated circuit (510). For example, a tapered section of silicon waveguide on buffer 220b that is optically coupled to polymer waveguide 211 may couple the light wave carrier received back from buffer 220a into the silicon waveguide on buffer 220b. The light wave carrier is coupled back from the second silicon waveguide into the polymer waveguide (512). For example, if the light wave carrier is not diverted by a wavelength specific ring couple while traveling in the silicon waveguide on buffer 220b, a tapered section of silicon waveguide on buffer 220b that is optically coupled to polymer waveguide 211 may couple the light wave carrier back into polymer waveguide 211.

FIG. 6 is a flowchart illustrating multidrop optical communication to a plurality of devices on a module. One or more steps illustrated in FIG. 6 may be performed by, for example, module 100, system 200, buffer die 320, integrated circuit 420, and/or their components. From a host system and via an optical interface of a module, a first light wave carrier carrying first information and a second light wave carrier carrying second information is received where the first and second light wave carriers have different wavelengths (602). For example, optical interface 241 may receive, from host 290, light wave carriers of different wavelengths and carrying the same or different information—such as the light wave carriers represented by arrows 261a-261b in FIG. 2.

The first and second light wave carriers are coupled into a polymer waveguide disposed on the module (604). For example, optical interface 241 may couple the received light wave carriers into polymer waveguide 211. The first and second light wave carriers are coupled from the polymer waveguide into a first silicon waveguide disposed on a first integrated circuit (606). For example, a coupling structure (e.g., optical coupler 131 and/or tapered coupler section 432) may couple the light wave carriers into a silicon waveguide on buffer 220a.

The first light wave carrier is coupled to a first light sensing device disposed on the first integrated circuit in order to receive the first information from the first light wave carrier (608). For example, one or more of the light wave carriers traveling along the silicon waveguide on buffer 220a may be diverted by a wavelength specific ring coupler (e.g., ring coupler 434a) to another waveguide (e.g., waveguide 434b) and/or an optical-to-electrical converter (e.g., optical-to-electrical converter 422). The second light wave carrier is coupled back from the silicon waveguide into the polymer waveguide (610). For example, a coupling structure (e.g., optical coupler 132 and/or tapered coupler section 433) may couple the remaining light wave carrier(s) traveling along the silicon waveguide on buffer 220a into polymer waveguide 211.

The second light wave carrier received back from the first silicon waveguide is coupled into a second silicon waveguide disposed on a second integrated circuit (612). For example, a coupling structure (e.g., optical coupler 131 and/or tapered coupler section 432) may couple the remaining light wave carrier(s) traveling along polymer waveguide 211 into a silicon waveguide on buffer 220b. The second light wave carrier is coupled to a second light sensing device disposed on the second integrated circuit to receive the second information (614). For example, one or more of the light wave carriers traveling along the silicon waveguide on buffer 220b may be diverted by a wavelength specific ring coupler (e.g., ring coupler 434a) to another waveguide (e.g., waveguide 434b) and/or an optical-to-electrical converter (e.g., optical-to-electrical converter 422).

Figure 7:
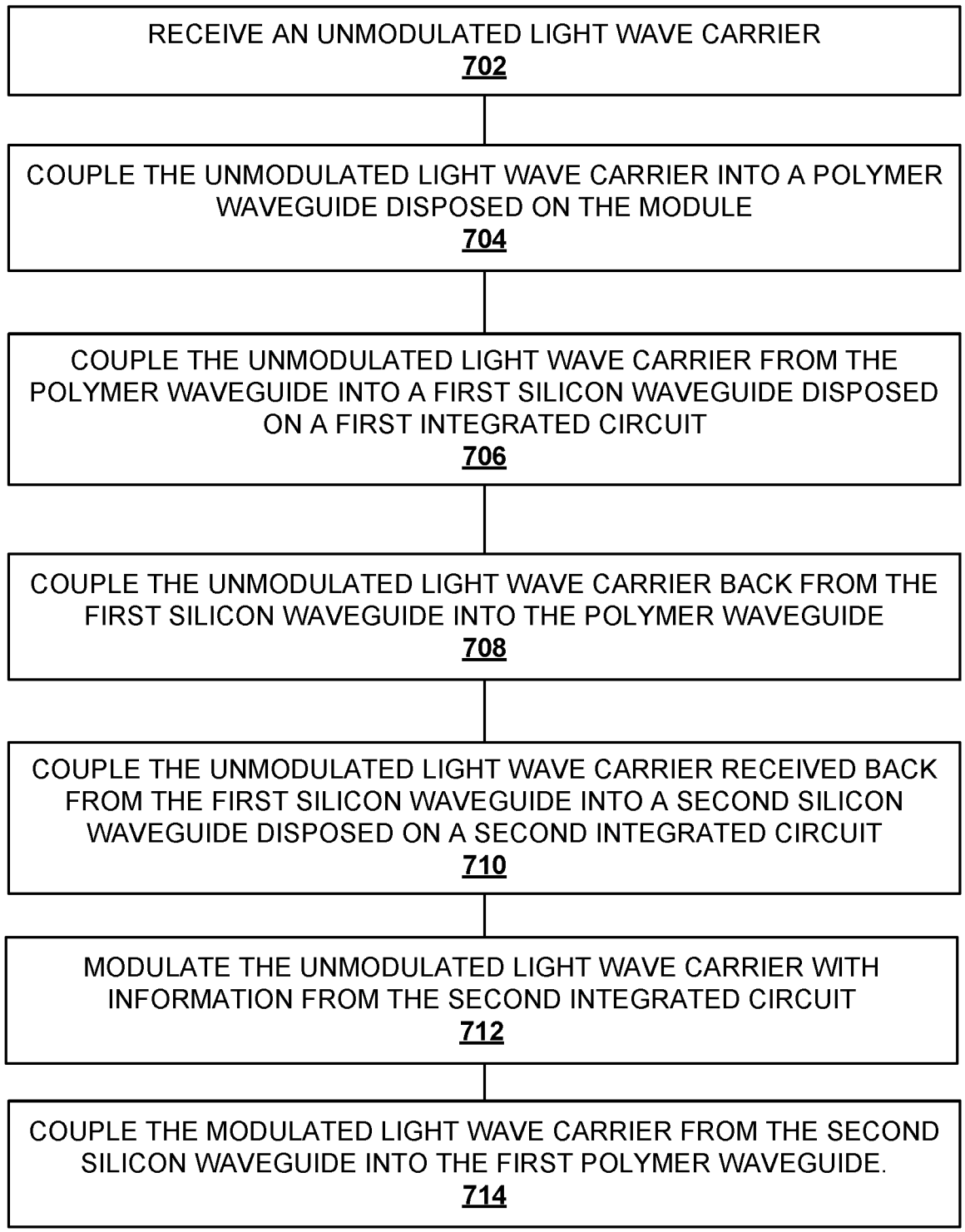
FIG. 7 is a flowchart illustrating optical communication from a device on a module.

FIG. 7 is a flowchart illustrating optical communication from a device on a module. One or more steps illustrated in FIG. 7 may be performed by, for example, module 100, system 200, buffer die 320, integrated circuit 420, and/or their components. An unmodulated light wave carrier is received (702). For example, optical interface 243 may receive one or more light wavelengths that are unmodulated. In another example, polymer waveguide 212 may receive an unmodulated light wave carrier(s) (e.g., from an on module 210 source).

The unmodulated light wave carrier is coupled into a polymer waveguide disposed on the module (704). For example, optical interface 243 may couple one or more unmodulated light wavelengths into polymer waveguide 212. In another example, an on-module 210 source may couple one or more unmodulated light wavelengths into polymer waveguide 212. The unmodulated light wave carriers are coupled from the polymer waveguide into a first silicon waveguide disposed on a first integrated circuit (706). For example, a coupling structure (e.g., optical coupler 135 and/or tapered coupler section 435) may couple one or more unmodulated light wave carriers into a silicon waveguide on buffer 220a. In another example, a mix of modulated (e.g., modulated by another buffer 220a-220c on module 210) and unmodulated light wave carriers may be coupled into a silicon waveguide on buffer 220a.

The unmodulated light wave carrier is coupled back from the silicon waveguide into the polymer waveguide (708). For example, a coupling structure (e.g., optical coupler 136 and/or tapered coupler section 436) may couple one or more unmodulated light wave carrier(s) traveling along the silicon waveguide on buffer 220a into polymer waveguide 212. The unmodulated light wave carrier received back from the first silicon waveguide is coupled into a second silicon waveguide on a second integrated circuit (710). For example, a coupling structure (e.g., optical coupler 135 and/or tapered coupler section 435) may couple one or more unmodulated light wave carrier(s) traveling along polymer waveguide 212 into a silicon waveguide on buffer 220b.

The unmodulated light wave carrier is modulated with information from the second integrated circuit (712). For example, one or more of the light wave carriers traveling along the silicon waveguide on buffer 220b may modulated by a wavelength specific ring modulator (e.g., ring modulator 438 in response to electrical circuitry 423a). The modulated light wave carrier from the second silicon waveguide is coupled into the first polymer waveguide (714). For example, a coupling structure (e.g., optical coupler 136 and/or tapered coupler section 436) may couple the modulated light wave carrier(s) traveling along the silicon waveguide on buffer 220b into polymer waveguide 211.

FIG. 8 is a flowchart illustrating communication with an electronic device on a module. One or more steps illustrated in FIG. 8 may be performed by, for example, module 100, system 200, buffer die 320, integrated circuit 420, and/or their components. A first light wave carrier modulated with first information for a memory device is coupled from a first polymer waveguide on a module into a first silicon waveguide disposed on a first integrated circuit (802). For example, light 161 that is modulated with information for integrated circuit 150 (which may be a memory device) may be coupled from polymer waveguide 111 into silicon waveguide 133 by optical coupler 131.

The first light wave carrier is coupled to a first light sensing device disposed on the first integrated circuit to receive the first information from the first light wave carrier (804). For example, one or more of the light wave carriers traveling along silicon waveguide 133 may be diverted by a wavelength specific coupler (e.g., wavelength selective optical coupler 134 and/or ring coupler 434a) to another waveguide and subsequently to an optical-to-electrical converter (e.g., optical-to-electrical converter 122 and/or optical-to-electrical converter 422).

The first information is communicated with the memory device (806). For example, electrical circuitry 123 may process and provide (e.g., via one or more electrical interfaces such as interfaces 423b-423c) some or all of the demodulated information to an additional integrated circuit 150 that is part of module 100. An example of information provided to integrated circuit 150 may be commands, addresses, and/or information that is to be stored in a memory array of integrated circuit 150. In the case of storing information in the memory array of integrated circuit 150, the remaining steps (808) to (816) illustrated in FIG. 8 may not be performed.

Second information is received from the memory device (808). For example, electrical circuitry 123 may receive (e.g., via one or more electrical interfaces such as interfaces 423b-423c), information from integrated circuit 150. An example of information received from integrated circuit may be information that is stored in a memory array of integrated circuit 150.

From a second polymer waveguide and into a second silicon waveguide disposed on the first integrate circuit, a second light wave carrier that is unmodulated is received (810). For example, light 163 that is unmodulated may be coupled from polymer waveguide 112 into silicon waveguide 137 by optical coupler 135. The second light wave carrier is modulated with the second information (812). For example, one or more of the light wave carriers traveling along silicon waveguide 137 may modulated by a wavelength selective optical modulator 138 in response to electrical circuitry 123.

The second light wave carrier modulated with the second information is coupled into the second polymer waveguide (814). For example, optical coupler 136 and/or tapered coupler section 436) may couple the modulated light wave carrier(s) traveling along the silicon waveguide 137 into polymer waveguide 112. The second light wave carrier modulated with the second information is coupled into a third silicon waveguide disposed on a second integrated circuit (816). For example, the modulated (by 138) light wave carrier traveling along waveguide 112 may be coupled may be coupled from polymer waveguide 112 into a silicon waveguide 137 on another buffer 220a-220c.

Figure 9:
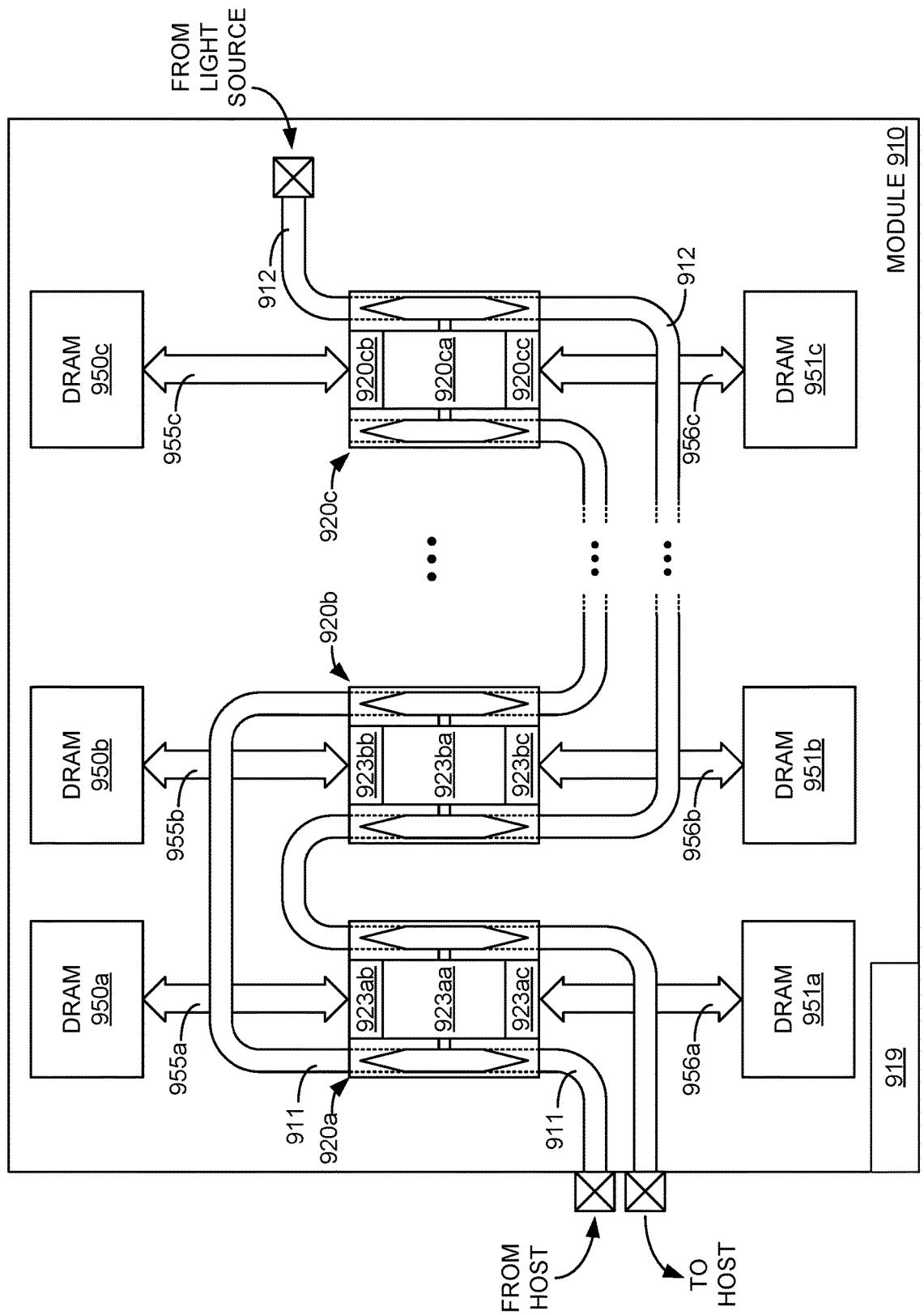
FIG. 9 is an example module floorplan compatible with an optical input/output memory module.

FIG. 9 is an example module floorplan compatible with an optical input/output memory module. In FIG. 9, memory module 910 comprises waveguide 911, waveguide 912, buffer integrated circuits 920a-920c, DRAMs 950a-950c, DRAMs 951a-951c, electrical interconnect 955a-955c, and electrical interconnect 956a-956c. Buffer integrated circuits 920a-920c respectively include electrical circuitry 923aa-923ca, interface 923ab-923cb, interface 923ac-923cc, and miscellaneous, side channel, and/or power interface 219.

Buffer integrated circuits 920a-920c are operatively coupled via optical waveguide 911 in a daisy chain topology running from 920a as the leftmost buffer integrated circuit in FIGS. 9 to 920c as the rightmost buffer integrated circuit in FIG. 9. In other words, modulated light from a host is coupled into waveguide 911. Then the light is coupled into buffer integrated circuit 920a. The light is optionally received and/or diverted by buffer integrated circuit 920a. Then buffer integrated circuit 920a couples the remaining light back into waveguide 911.

After buffer integrated circuit 920a, the remaining light is coupled into buffer integrated circuit 920b. The light is optionally received and/or diverted by buffer integrated circuit 920b. Then integrated circuit 920b couples the remaining light back into waveguide 911. This daisy chaining proceeds (e.g., for 10 total buffer devices) until the remaining light is coupled into buffer integrated circuit 920c and the light is optionally received and/or diverted by buffer integrated circuit 920c. Any remaining light (if any) is not provided to additional integrated circuits by waveguide 911.

Buffer integrated circuits 920a-920c are operatively coupled via optical waveguide 912 in a daisy chain topology running from 920c as the rightmost buffer integrated circuit in FIGS. 9 to 920a as the lefttmost buffer integrated circuit in FIG. 9. In other words, unmodulated light is coupled into waveguide 912. Then the light is coupled into buffer integrated circuit 920c. The light is optionally modulated by buffer integrated circuit 920c. Then buffer integrated circuit 920c couples the modulated and unmodulated light back into waveguide 912. This daisy chaining proceeds (e.g., for 10 total buffer devices) until the modulated and unmodulated light is coupled into and then back from buffer integrated circuit 920a. The modulated light emerging from buffer integrated circuit 920a is provided to a host. Thus, it should be understood that the optical waveguides 911-912 forming the optical interconnect among buffer integrated circuits 920a-920c run substantially with a horizontal orientation. In FIG. 9, DRAMs 950a-950c are illustrated as operatively coupled electrically to respective buffer integrated circuits 920a-920c, via respective interfaces 923ab-923cb, using a vertical orientation of interconnects 955a-955b. DRAMs 951a-951c are illustrated as operatively coupled electrically to respective buffer integrated circuits 920a-920c, via respective interfaces 923ac-923cc, using a vertical orientation of interconnects 956a-956b. Thus, it should be understood that electrical connections between buffer integrated circuits 920a-920c and the respective ones DRAMs 950a-950c 951a-951c run predominately perpendicular to waveguide 911 and waveguide 912.

Since each coupling in and out of silicon waveguides and each passing through a ring resonator or modulator causes some reduction of the light intensity (insertion loss), a module 910 might use more than one daisy chain for input and output. E.g., ten buffer integrated circuits 920a-920c, e.g., for a multiple of ten memory devices, could be connected five each to two pairs of input and output polymer waveguides or eleven buffer integrated circuits 920a-920c, e.g. for a multiple of ten memory devices and an additional chip like a RCD (register clock driver), could be connected via three pairs, two of length four (connecting a multiple of the first and second four memory devices) and one of length three (connecting a multiple of two memory devices and the RCD chip).

Figure 10A:
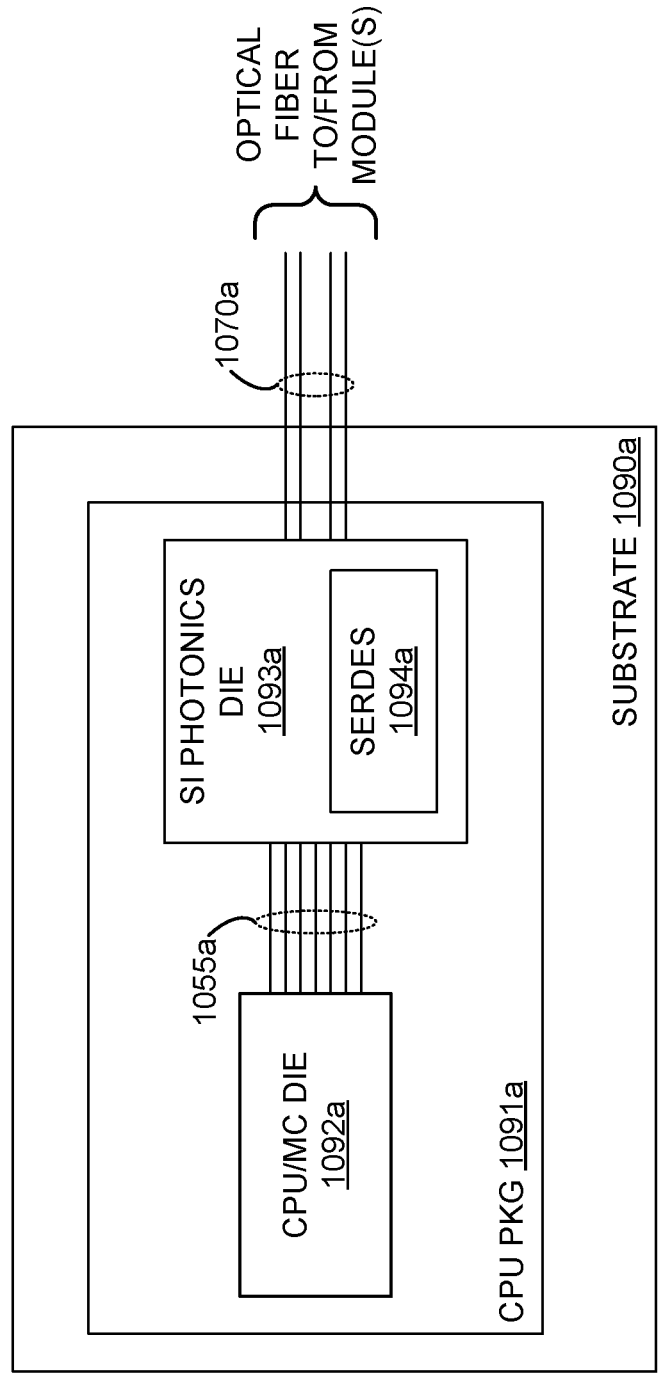
FIGS. 10A-10H illustrate host configurations.

FIGS. 10A-10H illustrate host configurations. In FIG. 10A, a host system 1099a comprises a substrate 1090a and optical fibers 1070a running to/from optical memory modules. Substrate 1090a includes a CPU package 1091a. CPU package 1091a includes combined CPU and memory controller (MC) die 1092a and a silicon photonics die 1093a. CPU/MC die 1092a is operatively coupled to silicon photonics die 1093a via a wide (i.e., relatively large number of signals—e.g., greater than 32) slow link 1055a. Optical fibers 1070a run to/from optical memory modules to silicon photonics die 1093a in CPU package 1091b. Silicon photonics die 1093a includes serializer/deserializer 1094a to help interface the narrow and fast signaling rate on optical fibers 1070a with the wide and slow signaling rate on link 1055a.

Figure 10B:
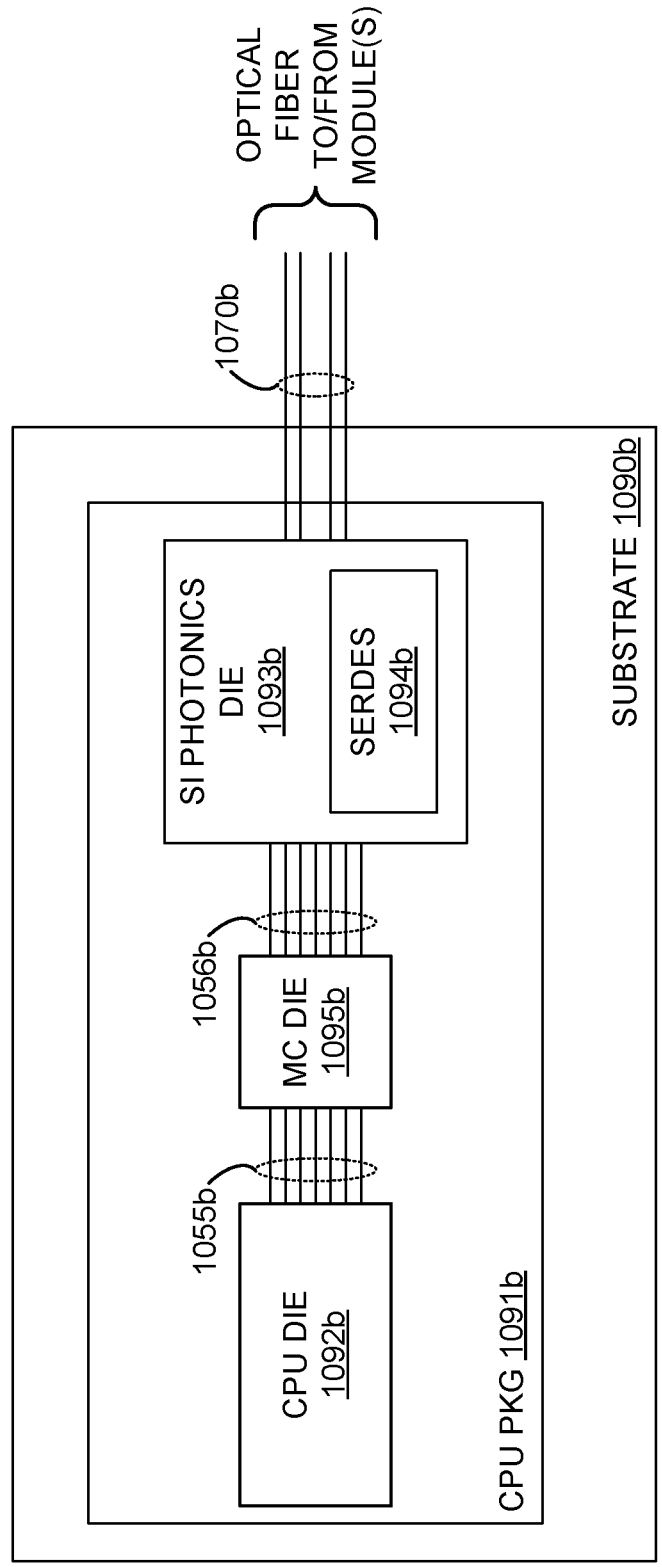

In FIG. 10B, a host system 1099b comprises a substrate 1090b and optical fibers 1070b running to/from optical memory modules. Substrate 1090b includes a CPU package 1091b. CPU package 1091b includes CPU die 1092b, memory controller (MC) die 1095b and silicon photonics die 1093b. CPU die 1092b is operatively coupled MC die 1095b via wide slow link 1055b. MC 1095b die is operatively coupled to silicon photonics die 1093c via wide slow link 1056b. Optical fibers 1070b run to/from optical memory modules to silicon photonics die 1093b in CPU package 1091b. Silicon photonics die 1093b includes serializer/deserializer 1094b to help interface the narrow and fast signaling rate on optical fibers 1070b with the wide and slow signaling rate on link 1056b.

Figure 10C:
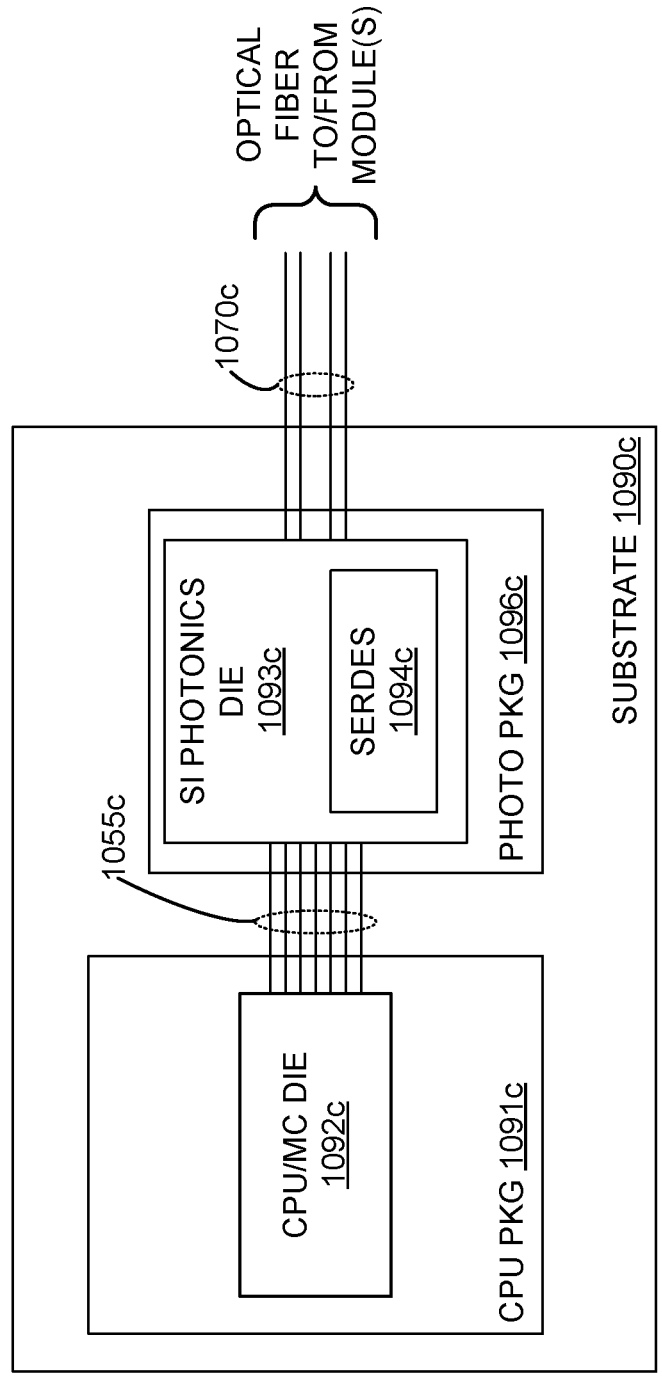

In FIG. 10C, a host system 1099c comprises a substrate 1090c and optical fibers 1070c running to/from optical memory modules. Substrate 1090c includes a CPU package 1091c and a photonics package 1096c. CPU package 1091c includes combined CPU and memory controller (MC) die 1092c. Photonics package 1096c includes silicon photonics die 1093c. CPU/MC die 1092c is operatively coupled to silicon photonics die 1093c via a wide slow link 1055c. Optical fibers 1070c run to/from optical memory modules to silicon photonics die 1093c in photonics package 1095c. Silicon photonics die 1093c includes serializer/deserializer 1094c to help interface the narrow and fast signaling rate on optical fibers 1070c with the wide and slow signaling rate on link 1055c.

Figure 10D:
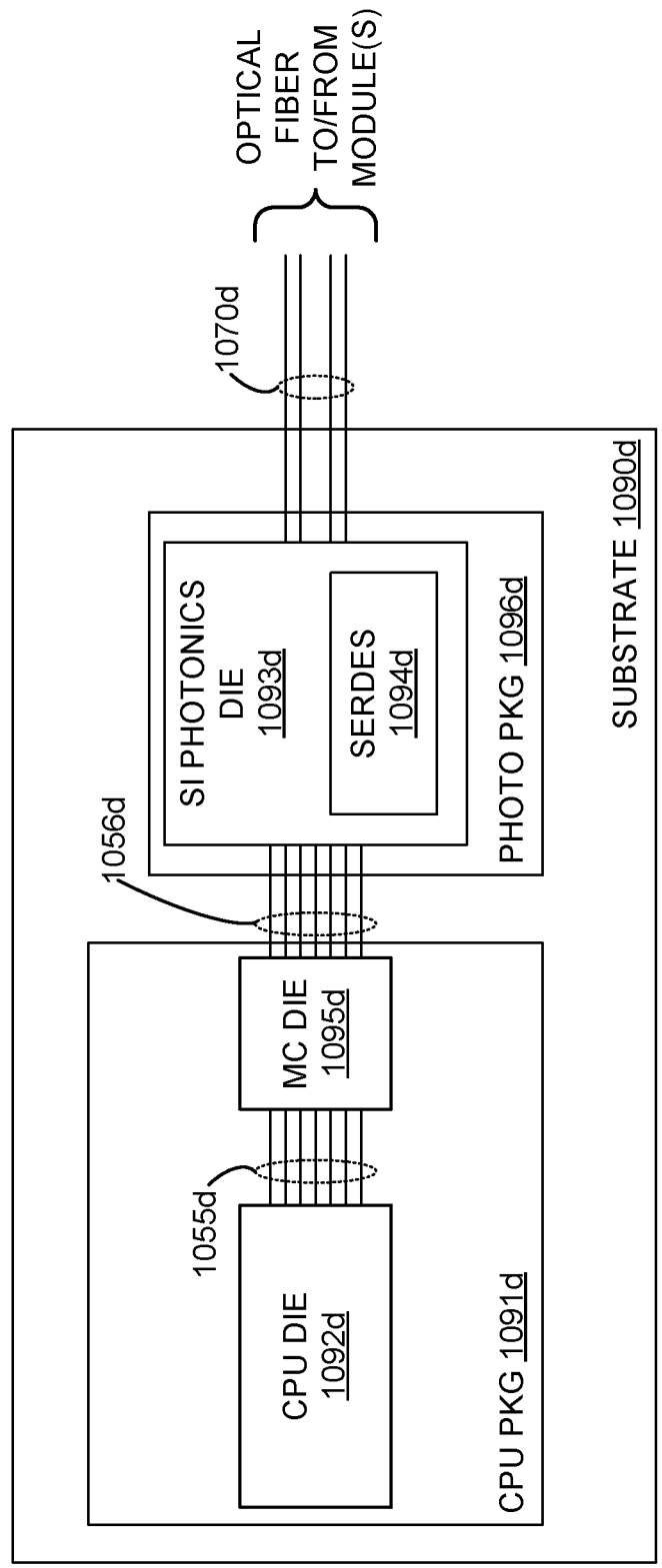

In FIG. 10D, a host system 1099d comprises a substrate 1090d and optical fibers 1070d running to/from optical memory modules. Substrate 1090d includes CPU package 1091d and photonics package 1096d. CPU package 1091d includes CPU die 1092d and memory controller (MC) die 1095d. Photonics package 1096d includes silicon photonics die 1093d. CPU die 1092d is operatively coupled MC die 1095d via wide slow link 1055d. MC 1095d die is operatively coupled to silicon photonics die 1093d via wide slow link 1056d. Optical fibers 1070d run to/from optical memory modules to silicon photonics die 1093b in photonics package 1096d. Silicon photonics die 1093d includes serializer/deserializer 1094d to help interface the narrow and fast signaling rate on optical fibers 1070d with the wide and slow signaling rate on link 1056d.

Figure 10E:
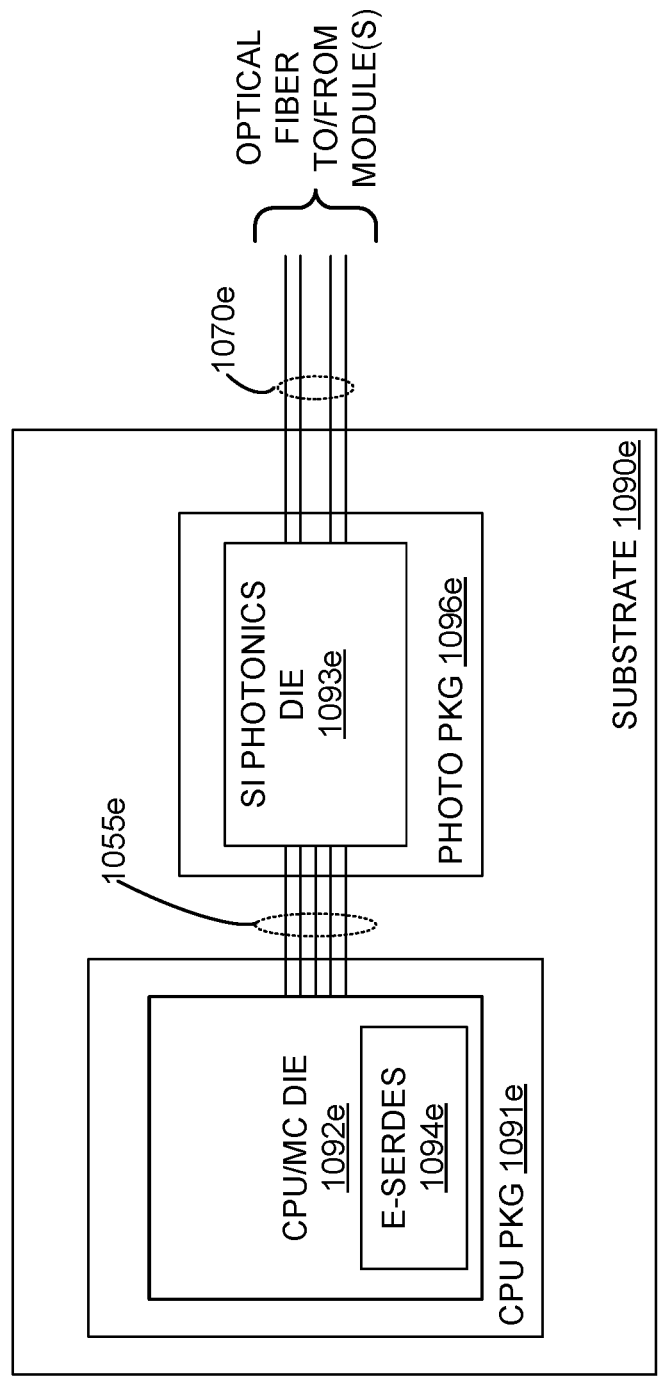

In FIG. 10E, a host system 1099e comprises a substrate 1090e and optical fibers 1070e running to/from optical memory modules. Substrate 1090e includes CPU package 1091e and photonics package 1096e. CPU package 1091e includes combined CPU and memory controller (MC) die 1092e. Photonics package 1096e includes silicon photonics die 1093e. Combined CPU/MC die 1092e die is operatively coupled to silicon photonics die 1093d via narrow and fast link 1055e. Optical fibers 1070e run to/from optical memory modules to silicon photonics die 1093e in photonics package 1096e. CPU/MC die 1092e includes electrical serializer/deserializer 1094e to help interface the narrow and fast signaling rate of link 1055e with the internal signaling of CPU/MC die 1092e.

Figure 10F:
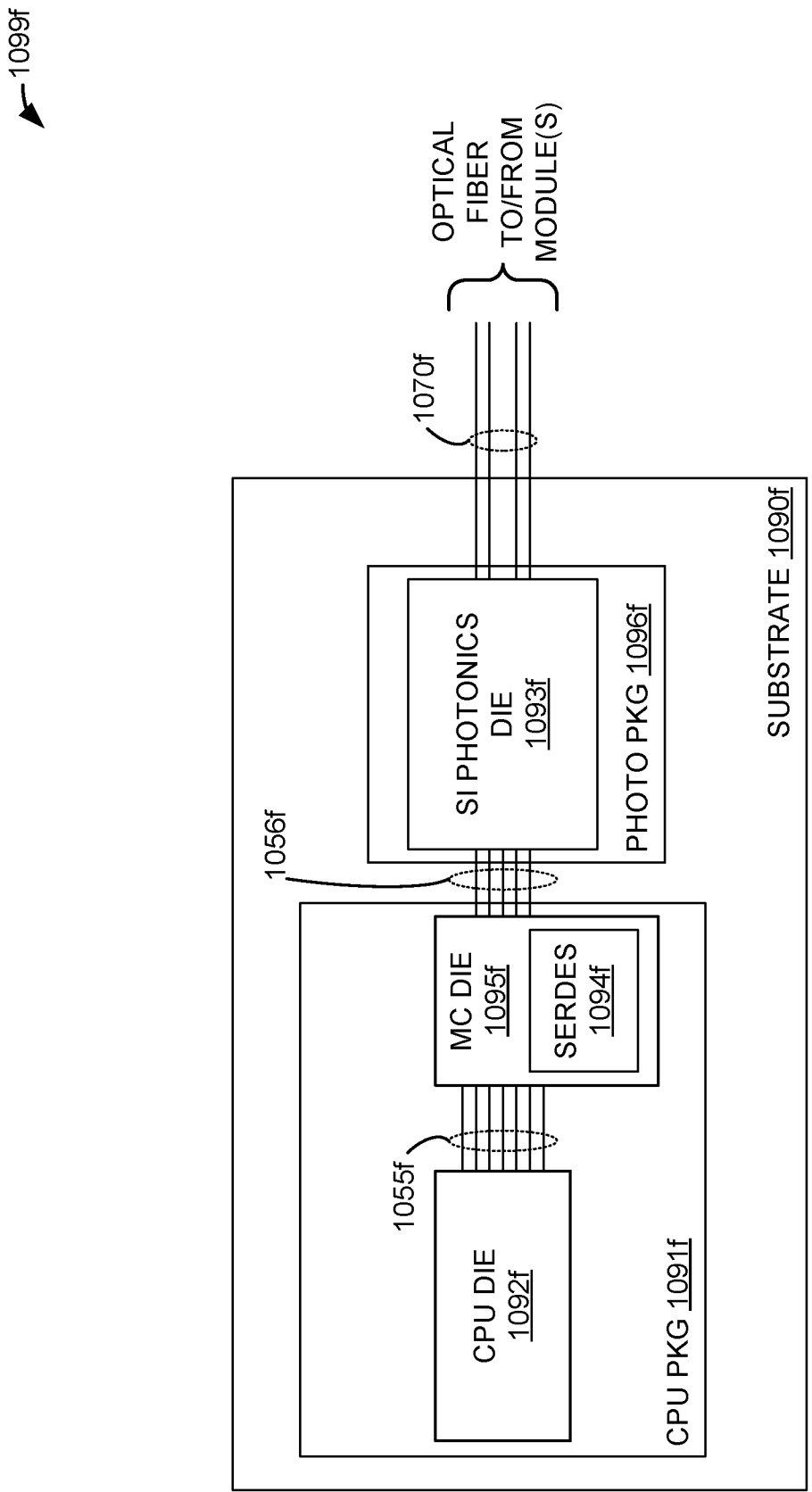

In FIG. 10F, a host system 1099f comprises a substrate 1090f and optical fibers 1070f running to/from optical memory modules. Substrate 1090f includes CPU package 1091f and photonics package 1096f. CPU package 1091f includes CPU die 1092f and memory controller (MC) die 1095f. Photonics package 1096f includes silicon photonics die 1093f. CPU die 1092f is operatively coupled MC die 1095f via wide slow link 1055f. MC die 1095f is operatively coupled to silicon photonics die 1093f via narrow fast link 1056f. Optical fibers 1070f run to/from optical memory modules to silicon photonics die 1093f in photonics package 1096f. MC die 1095f includes electrical serializer/deserializer 1094f to help interface the narrow and fast signaling rate of link 1056f with the wide and slow signaling of link 1055f.

Figure 10G:
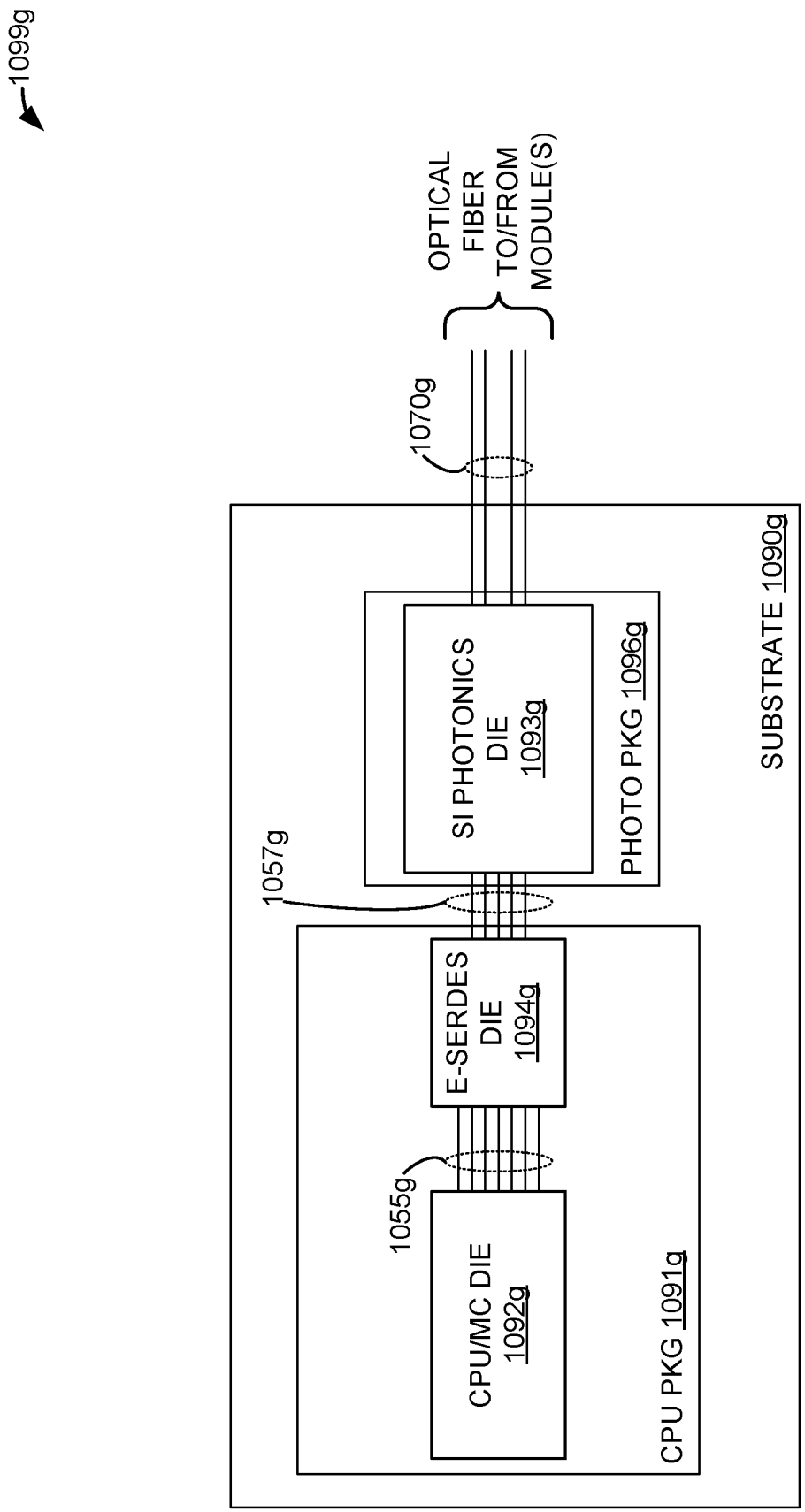

In FIG. 10G, a host system 1099g comprises a substrate 1090g and optical fibers 1070g running to/from optical memory modules. Substrate 1090g includes CPU package 1091g and photonics package 1096g. CPU package 1091g includes combined CPU and memory controller (MC) die 1092g and electronic serializer/deserializer die 1094g. Photonics package 1096g includes silicon photonics die 1093g. Combined CPU/MC die 1092g die is operatively coupled to serializer/deserializer die 1094g via wide and slow link 1055g. Serializer/deserializer die 1094g is operatively coupled to silicon photonics die 1093g via narrow and fast link 1057g. Optical fibers 1070g run to/from optical memory modules to silicon photonics die 1093g in photonics package 1096g. Serializer/deserializer die 1094g helps interface the narrow and fast signaling rate of link 1057g with the wide and slow signaling of link 1055g.

Figure 10H:
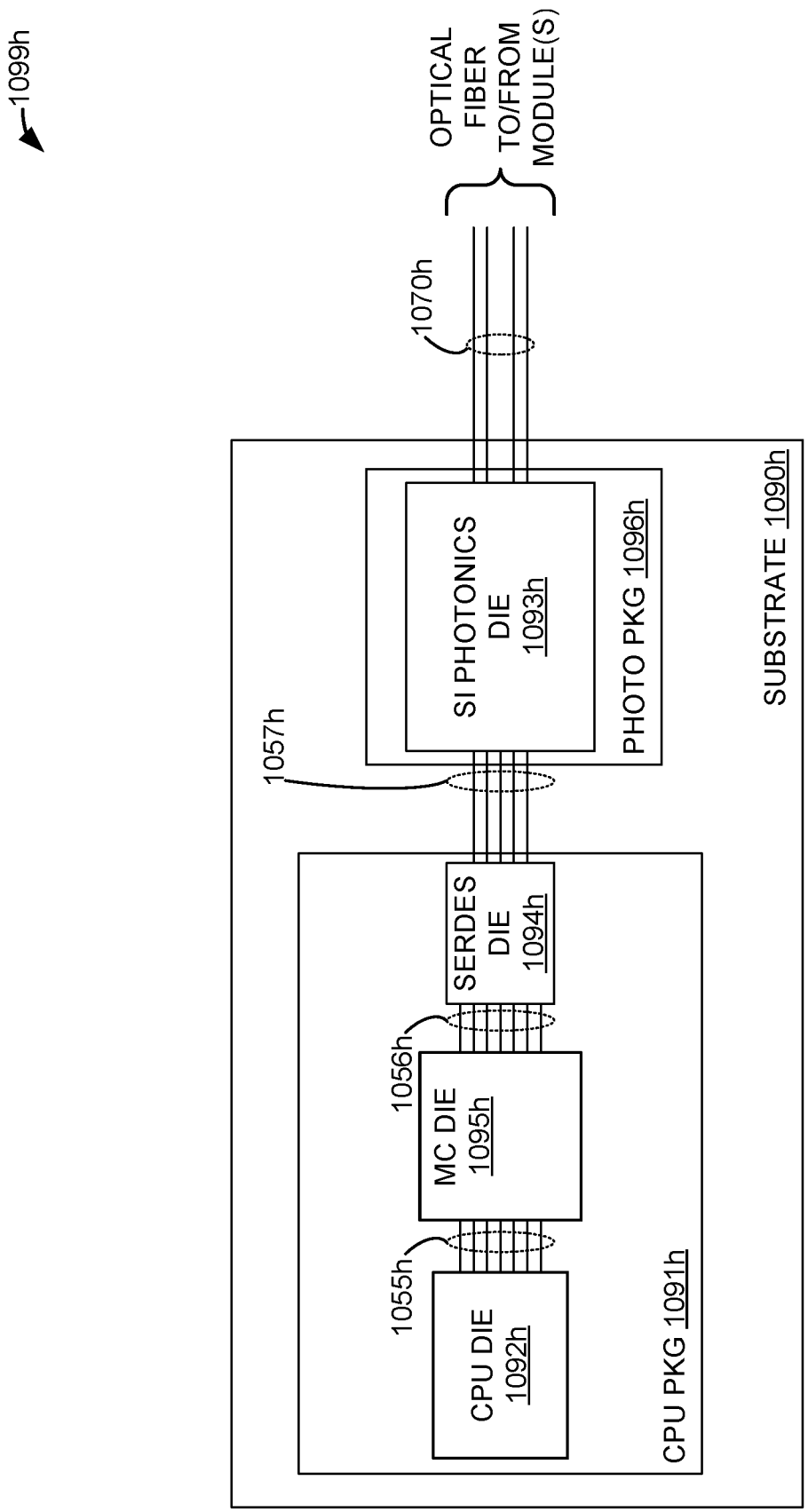

In FIG. 10H, a host system 1099h comprises a substrate 1090h and optical fibers 1070h running to/from optical memory modules. Substrate 1090h includes CPU package 1091h and photonics package 1096h. CPU package 1091h includes CPU die 1092h, memory controller (MC) die 1095h, and electronic serializer/deserializer die 1094h. Photonics package 1096h includes silicon photonics die 1093h. CPU die 1092g die is operatively coupled to MC die 1095h via wide and slow link 1055h. MC die 1095h is operatively coupled to serializer/deserializer die 1094h via wide and slow link 1056h. Serializer/deserializer die 1094h is operatively coupled to silicon photonics die 1093h via narrow and fast link 1057h. Optical fibers 1070h run to/from optical memory modules to silicon photonics die 1093h in photonics package 1096h. Serializer/deserializer die 1094h helps interface the narrow and fast signaling rate of link 1057h with the wide and slow signaling of link 1056g.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of module 100, system 200, buffer die 320, integrated circuit 420, host systems 1090a-1090g, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 11:
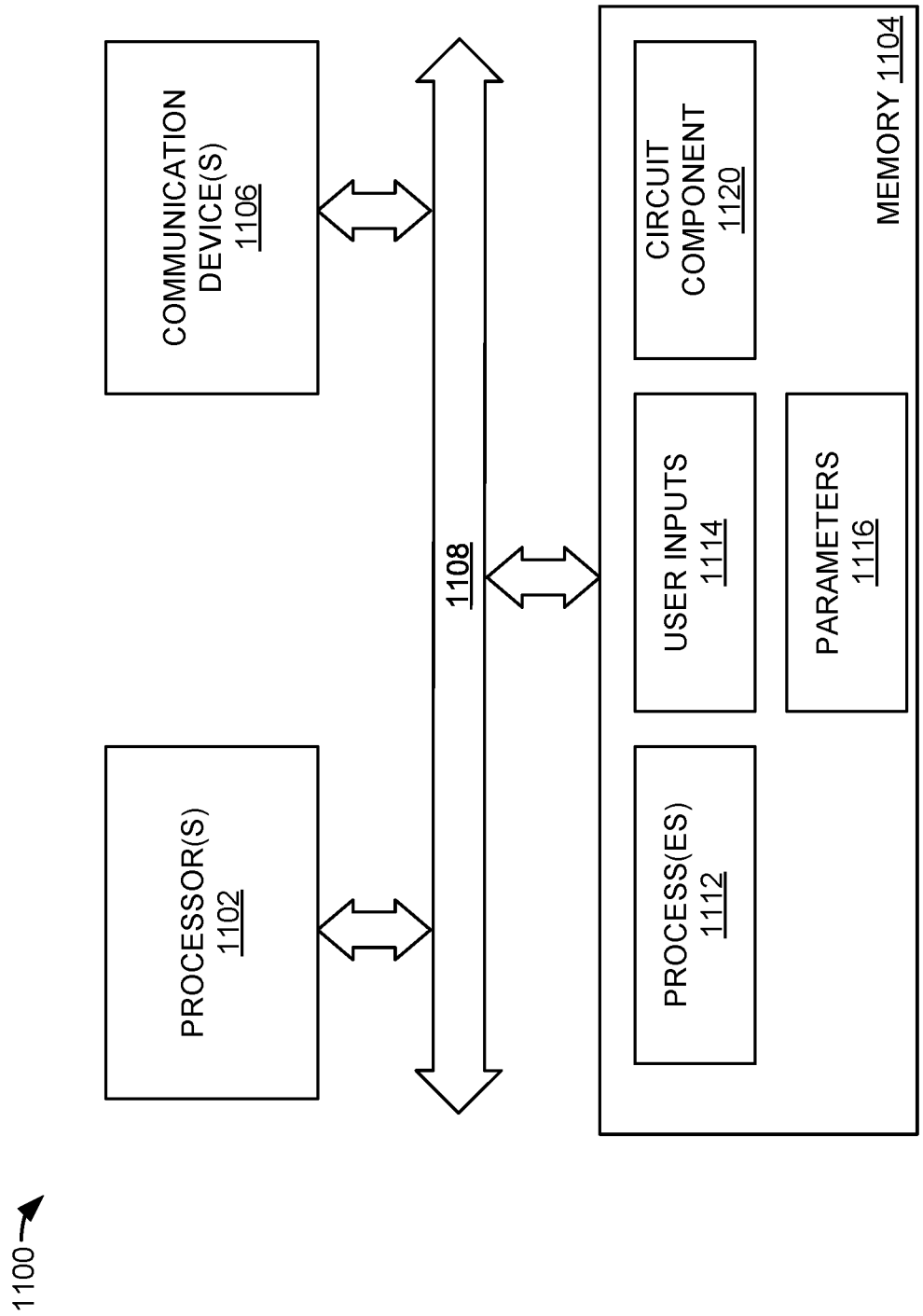
FIG. 11 is a block diagram of a processing system.

FIG. 11 is a block diagram illustrating one embodiment of a processing system 1100 for including, processing, or generating, a representation of a circuit component 1120. Processing system 1100 includes one or more processors 1102, a memory 1104, and one or more communications devices 1106. Processors 1102, memory 1104, and communications devices 1106 communicate using any suitable type, number, and/or configuration of wired and/or wireless connections 1108.

Processors 1102 execute instructions of one or more processes 1112 stored in a memory 1104 to process and/or generate circuit component 1120 responsive to user inputs 1114 and parameters 1116. Processes 1112 may be any suitable electronic design automation (EDA) tool or portion thereof used to design, simulate, analyze, and/or verify electronic circuitry and/or generate photomasks for electronic circuitry. Representation 1120 includes data that describes all or portions of module 100, system 200, buffer die 320, integrated circuit 420, host systems 1090a-1090g, and their components, as shown in the Figures.

Representation 1120 may include one or more of behavioral, register transfer, logic component, transistor, and layout geometry-level descriptions. Moreover, representation 1120 may be stored on storage media or communicated by carrier waves.

Data formats in which representation 1120 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 1114 may comprise input parameters from a keyboard, mouse, voice recognition interface, microphone and speakers, graphical display, touch screen, or other type of user interface device. This user interface may be distributed among multiple interface devices. Parameters 1116 may include specifications and/or characteristics that are input to help define representation 1120. For example, parameters 1116 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1104 includes any suitable type, number, and/or configuration of non-transitory computer-readable storage media that stores processes 1112, user inputs 1114, parameters 1116, and circuit component 1120.

Communications devices 1106 include any suitable type, number, and/or configuration of wired and/or wireless devices that transmit information from processing system 1100 to another processing or storage system (not shown) and/or receive information from another processing or storage system (not shown). For example, communications devices 1106 may transmit circuit component 1120 to another system. Communications devices 1106 may receive processes 1112, user inputs 1114, parameters 1116, and/or circuit component 1120 and cause processes 1112, user inputs 1114, parameters 1116, and/or circuit component 1120 to be stored in memory 1104.

Implementations discussed herein include, but are not limited to, the following examples:

Example 1: A module, comprising: a first buffer die including a first silicon waveguide; a second buffer die including a second silicon waveguide; a first optical interface to receive a first light wave carrier, carrying first information, from a host system into a first polymer waveguide disposed on the module; and, the first polymer waveguide to couple the first light wave carrier into the first silicon waveguide and to receive the first light wave carrier back from the first silicon waveguide and to couple first light wave carrier received back from the first silicon waveguide into the second silicon waveguide and to receive the first light wave carrier back from the second silicon waveguide.

Example 2: The module of example 1, further comprising: a first memory device electrically coupled with the first buffer die to communicate the first information between the first buffer die and the first memory device.

Example 3: The module of example 2, wherein electrical connections between the first memory device and the first buffer die are oriented predominately perpendicular to the first polymer waveguide.

Example 4: The module of example 2, wherein the first optical interface is to couple a second light wave carrier, carrying second information, from the host system into the first polymer waveguide disposed on the module, the second light wave carrier to have a different wavelength than the first light wave carrier, the first polymer waveguide to couple the second light wave carrier into the first silicon waveguide and to receive the second light wave carrier back from the first silicon waveguide and to couple second light wave carrier received back from the first silicon waveguide into the second silicon waveguide and to receive the second light wave carrier back from the second silicon waveguide.

Example 5: The module of example 4, further comprising: a second memory device electrically coupled with the second buffer die to communicate the second information between the second buffer die and the second memory device.

Example 6: The module of example 5, wherein electrical connections between the second memory device and the second buffer die are oriented predominately perpendicular to the first polymer waveguide.

Example 7: The module of example 5, further comprising: a second optical interface to transmit a third light wave carrier, carrying third information, from a second polymer waveguide disposed on the module to the host system, the first buffer die further including a third silicon waveguide, the second buffer die further including a fourth silicon waveguide, the second polymer waveguide to couple the third light wave carrier into the third silicon waveguide and to receive the third light wave carrier back from the third silicon waveguide and to couple third light wave carrier received back from the third silicon waveguide into the fourth silicon waveguide and to receive the third light wave carrier back from the fourth silicon waveguide.

Example 8: The module of example 7, wherein the first buffer die is to modulate the third light wave carrier with the third information, and the third information is received by the first buffer die from the first memory device.

Example 9: The module of example 8, wherein electrical connections between the first memory device and the first buffer die are oriented predominately perpendicular to the second polymer waveguide.

Example 10: The module of example 8, wherein the second optical interface is to transmit a fourth light wave carrier, carrying fourth information, from the second polymer waveguide to the host system, the fourth light wave carrier to have a different wavelength than the third light wave carrier, the second polymer waveguide to couple the fourth light wave carrier into the third silicon waveguide and to receive the fourth light wave carrier back from the third silicon waveguide and to couple fourth light wave carrier received back from the third silicon waveguide into the fourth silicon waveguide and to receive the fourth light wave carrier back from the fourth silicon waveguide.

Example 11: The module of example 10, wherein the second buffer die is to modulate the fourth light wave carrier with the fourth information, and the fourth information is received by the second buffer die from the second memory device.

Example 12: A module, comprising: a plurality of buffer devices each electrically coupled to respective ones of a plurality of memory devices to communicate information between each of the plurality of buffer devices and respective ones of the plurality of memory devices; a first optical interface to receive, via a first light wave carrier, first information from a host system; a second optical interface to transmit, via a second light wave carrier, second information to the host system; a first polymer waveguide to sequentially couple the first light wave carrier, with the first information, to each of the plurality of buffer devices and to sequentially receive back, with the first information, the first light wave carrier from each of the plurality of buffer devices; and, a second polymer waveguide to sequentially couple the second light wave carrier to each of the plurality of buffer devices and to sequentially receive back the second light wave carrier from each of the plurality of buffer devices.

Example 13: The module of example 12, wherein electrical connections between each of the plurality of buffer devices and the respective ones of the plurality of memory devices run predominately perpendicular to the first polymer waveguide.

Example 14: The module of example 12, wherein a first one of the plurality of buffer devices modulates the second light wave carrier to carry the second information.

Example 15: The module of example 14, wherein the first one of the plurality of buffer devices communicates the first information with a first one of the plurality of memory devices.

Example 16: The module of example 15, wherein a second one of the plurality of buffer devices does not communicate the first information with the respective one of the plurality of memory devices coupled to the second one of the plurality of buffer devices.

Example 17: The module of example 16, wherein the first optical interface is to receive, via a third light wave carrier, third information from the host system, the second optical interface is to transmit, via a fourth light wave carrier, fourth information to the host system.

Example 18: The module of example 17, wherein the second one of the plurality of buffer devices modulates the fourth light wave carrier to carry the fourth information.

Example 19: The module of example 18, wherein the second one of the plurality of buffer devices communicates the third information with a respective one of the plurality of memory devices coupled to the second one of the plurality of buffer devices.

Example 20: A method operating a module, comprising: receiving, via a first optical interface of the module, a first light wave carrier, carrying first information, from a host system; coupling the first light wave carrier into a first polymer waveguide disposed on the module; coupling the first light wave carrier from the first polymer waveguide into a first silicon waveguide disposed on a first integrated circuit; coupling the first light wave carrier back from the first silicon waveguide into the first polymer waveguide; coupling first light wave carrier received back from the first silicon waveguide into a second silicon waveguide disposed on a second integrated circuit; and, coupling the first light wave carrier back from the second silicon waveguide into the first polymer waveguide.

Example 21: The method of example 20, further comprising: electronically communicating the first information between the first integrated circuit and a first memory device.

Example 22: The method of example 20, further comprising: transmitting, from a second optical interface and to the host system, a second light wave carrier received from a second polymer waveguide disposed on the module.

Example 23: The method of example 22, further comprising: coupling the second light wave carrier from the second polymer waveguide into a third silicon waveguide disposed on the first integrated circuit; coupling the second light wave carrier back from the third silicon waveguide into the second polymer waveguide; coupling the second light wave carrier received back from the third silicon waveguide into a fourth silicon waveguide disposed on the second integrated circuit; and, coupling the second light wave carrier back from the fourth silicon waveguide into the second polymer waveguide.

Example 24: The method of example 23, further comprising: modulating, by at least one of the first integrated circuit and the second integrated circuit, the second light wave carrier to carry second information.

Example 25: The method of example 23, further comprising: electronically communicating the first information between the first integrated circuit and a first memory device; electronically communicating second information between the first integrated circuit and the first memory device; and, modulating, by the first integrated circuit, the second light wave carrier to carry the second information.

Example 26: The method of example 25, further comprising: receiving, via the first optical interface of the module, a third light wave carrier, carrying third information, from the host system, the third light wave carrier having a different wavelength than the first light wave carrier; coupling the third light wave carrier into the first polymer waveguide disposed on the module; coupling the third light wave carrier from the first polymer waveguide into the first silicon waveguide disposed on the first integrated circuit; coupling the third light wave carrier back from the first silicon waveguide into the first polymer waveguide; coupling third light wave carrier received back from the first silicon waveguide into the second silicon waveguide disposed on the second integrated circuit; coupling the third light wave carrier back from the second silicon waveguide into the first polymer waveguide; and, electronically communicating the third information between the second integrated circuit and a second memory device.

Example 27: The method of example 26, further comprising: coupling a fourth light wave carrier from the second polymer waveguide into the third silicon waveguide disposed on the first integrated circuit, the fourth light wave carrier having a different wavelength than the second light wave carrier; coupling the fourth light wave carrier back from the third silicon waveguide into the second polymer waveguide; coupling fourth light wave carrier received back from the third silicon waveguide into the fourth silicon waveguide disposed on the second integrated circuit; modulating, by the second buffer die, the fourth light wave carrier to carry fourth information; coupling the fourth light wave carrier back from the fourth silicon waveguide into the second polymer waveguide; and, transmitting, from the second optical interface and to the host system, the fourth light wave carrier that is carrying the fourth information.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A module, comprising:
a first buffer die including a first silicon waveguide;
a second buffer die including a second silicon waveguide;
a first optical interface to receive a first light wave carrier, carrying first information, from a host system into a first polymer waveguide disposed on the module; and,
the first polymer waveguide to couple the first light wave carrier into the first silicon waveguide and to receive the first light wave carrier back from the first silicon waveguide and to couple first light wave carrier received back from the first silicon waveguide into the second silicon waveguide and to receive the first light wave carrier back from the second silicon waveguide.

2. The module of claim 1, further comprising:
a first memory device electrically coupled with the first buffer die to communicate the first information between the first buffer die and the first memory device.

3. The module of claim 2, wherein electrical connections between the first memory device and the first buffer die are oriented predominately perpendicular to the first polymer waveguide.

4. The module of claim 2, wherein the first optical interface is to couple a second light wave carrier, carrying second information, from the host system into the first polymer waveguide disposed on the module, the second light wave carrier to have a different wavelength than the first light wave carrier, the first polymer waveguide to couple the second light wave carrier into the first silicon waveguide and to receive the second light wave carrier back from the first silicon waveguide and to couple second light wave carrier received back from the first silicon waveguide into the second silicon waveguide and to receive the second light wave carrier back from the second silicon waveguide.

5. The module of claim 4, further comprising:
a second memory device electrically coupled with the second buffer die to communicate the second information between the second buffer die and the second memory device.

6. The module of claim 5, wherein electrical connections between the second memory device and the second buffer die are oriented predominately perpendicular to the first polymer waveguide.

7. The module of claim 5, further comprising:
a second optical interface to transmit a third light wave carrier, carrying third information, from a second polymer waveguide disposed on the module to the host system, the first buffer die further including a third silicon waveguide, the second buffer die further including a fourth silicon waveguide, the second polymer waveguide to couple the third light wave carrier into the third silicon waveguide and to receive the third light wave carrier back from the third silicon waveguide and to couple third light wave carrier received back from the third silicon waveguide into the fourth silicon waveguide and to receive the third light wave carrier back from the fourth silicon waveguide.

8. A module, comprising:
a plurality of buffer devices each electrically coupled to respective ones of a plurality of memory devices to communicate information between each of the plurality of buffer devices and respective ones of the plurality of memory devices;
a first optical interface to receive, via a first light wave carrier, first information from a host system;
a second optical interface to transmit, via a second light wave carrier, second information to the host system;
a first polymer waveguide to sequentially couple the first light wave carrier, with the first information, to each of the plurality of buffer devices and to sequentially receive back, with the first information, the first light wave carrier from each of the plurality of buffer devices; and,
a second polymer waveguide to sequentially couple the second light wave carrier to each of the plurality of buffer devices and to sequentially receive back the second light wave carrier from each of the plurality of buffer devices.

9. The module of claim 8, wherein electrical connections between each of the plurality of buffer devices and the respective ones of the plurality of memory devices run predominately perpendicular to the first polymer waveguide.

10. The module of claim 8, wherein a first one of the plurality of buffer devices modulates the second light wave carrier to carry the second information.

11. The module of claim 10, wherein the first one of the plurality of buffer devices communicates the first information with a first one of the plurality of memory devices.

12. The module of claim 11, wherein a second one of the plurality of buffer devices does not communicate the first information with the respective one of the plurality of memory devices coupled to the second one of the plurality of buffer devices.

13. The module of claim 12, wherein the first optical interface is to receive, via a third light wave carrier, third information from the host system, the second optical interface is to transmit, via a fourth light wave carrier, fourth information to the host system.

14. The module of claim 13, wherein the second one of the plurality of buffer devices modulates the fourth light wave carrier to carry the fourth information.

15. A method operating a module, comprising:
receiving, via a first optical interface of the module, a first light wave carrier, carrying first information, from a host system;
coupling the first light wave carrier into a first polymer waveguide disposed on the module;
coupling the first light wave carrier from the first polymer waveguide into a first silicon waveguide disposed on a first integrated circuit;
coupling the first light wave carrier back from the first silicon waveguide into the first polymer waveguide;
coupling first light wave carrier received back from the first silicon waveguide into a second silicon waveguide disposed on a second integrated circuit; and,
coupling the first light wave carrier back from the second silicon waveguide into the first polymer waveguide.

16. The method of claim 15, further comprising:
electronically communicating the first information between the first integrated circuit and a first memory device.

17. The method of claim 15, further comprising:
transmitting, from a second optical interface and to the host system, a second light wave carrier received from a second polymer waveguide disposed on the module.

18. The method of claim 17, further comprising:
coupling the second light wave carrier from the second polymer waveguide into a third silicon waveguide disposed on the first integrated circuit;
coupling the second light wave carrier back from the third silicon waveguide into the second polymer waveguide;
coupling the second light wave carrier received back from the third silicon waveguide into a fourth silicon waveguide disposed on the second integrated circuit; and,
coupling the second light wave carrier back from the fourth silicon waveguide into the second polymer waveguide.

19. The method of claim 18, further comprising:
modulating, by at least one of the first integrated circuit and the second integrated circuit, the second light wave carrier to carry second information.

20. The method of claim 18, further comprising:
electronically communicating the first information between the first integrated circuit and a first memory device;
electronically communicating second information between the first integrated circuit and the first memory device; and,
modulating, by the first integrated circuit, the second light wave carrier to carry the second information.

* * * * *